(12) United States Patent
Dimitrovski et al.

(10) Patent No.: US 12,621,881 B2
(45) Date of Patent: May 5, 2026

(54) GATEWAY DEVICE, SYSTEM AND METHOD FOR PROVIDING A FORWARDING POLICY

(71) Applicants: Koninklijke KPN N.V., Rotterdam (NL); Nederlandse Organisatie Voor Toegepast-Natuurwetenschappelijk Onderzoek TNO, 's-Gravenhage (NL)

(72) Inventors: Toni Dimitrovski, Boskoop (NL); José Luis Almodóvar Chico, Delft (NL); Nicolaas Wijnand Keesmaat, Voorburg (NL); Antonius Hendrikus Johannes Norp, The Hague (NL); Pascal Mathieu Agnes Marie Heijnen, Rotterdam (NL); Jarmo Theodore Wilkens, Málaga (ES)

(73) Assignees: Koninklijke KPN N.V., Rotterdam (NL); Nederlandse Organisatie Voor Toegepast-Natuurwetenschappelijk Onderzoek TNO, 's-Gravenhage (NL)

( * ) Notice: Subject to any disclaimer, the term of this patent is extended or adjusted under 35 U.S.C. 154(b) by 530 days.

(21) Appl. No.: 17/981,155

(22) Filed: Nov. 4, 2022

(65) Prior Publication Data

US 2023/0133444 A1     May 4, 2023

(30) Foreign Application Priority Data

Nov. 2, 2021    (EP) ..................................... 21206056

(51) Int. Cl.
*H04W 76/12* (2018.01)
*H04W 40/24* (2009.01)
(Continued)

(52) U.S. Cl.
CPC ........... *H04W 76/12* (2018.02); *H04W 40/24* (2013.01); *H04W 76/15* (2018.02); *H04W 88/16* (2013.01)

(58) Field of Classification Search
CPC ..... H04W 76/12; H04W 76/15; H04W 40/24; H04W 88/16
See application file for complete search history.

(56) References Cited

U.S. PATENT DOCUMENTS

| | | | |
|---|---|---|---|
| 2009/0190471 A1 * | 7/2009 | Mahendran ........... | H04L 47/215 370/230.1 |
| 2012/0140620 A1 * | 6/2012 | Hogan ................ | H04L 41/0894 370/230 |

(Continued)

FOREIGN PATENT DOCUMENTS

| | | | |
|---|---|---|---|
| WO | 2022112174 A1 | 6/2022 | |
| WO | WO-2022112847 A1 * | 6/2022 | ........ H04W 36/0033 |

OTHER PUBLICATIONS

3GPP, TS 23.503 v17.2.0—Technical Specification Group Services and System Aspects; Policy and Charging Control Framework for the 5G System (5GS); Stage 2, Release 17 (Sep. 2021).

(Continued)

*Primary Examiner* — Brenda H Pham
(74) *Attorney, Agent, or Firm* — Hamilton, Brook, Smith & Reynolds, P.C.

(57) ABSTRACT

One aspect of this disclosure pertains to a gateway device for use in a telecommunications network, wherein the telecommunications network comprises a policy control system configured to provide at least one forwarding policy to the gateway device. The gateway device may be configured to forward traffic of at least one user device connected to the gateway device to the telecommunications network. The gateway device is further configured to receive the forwarding policy from the policy control system over the telecommunications network. The gateway device may receive the forwarding policy using a PDU session establishment procedure, a PDU session modification procedure and/or a registration procedure. The gateway device is configured to (Continued)

enforce the received forwarding policy when forwarding traffic of the at least one user device towards the telecommunications network.

25 Claims, 10 Drawing Sheets

(51) Int. Cl.
 H04W 76/15 (2018.01)
 H04W 88/16 (2009.01)

(56) References Cited

U.S. PATENT DOCUMENTS

| | | | | |
|---|---|---|---|---|
| 2022/0255971 A1* | 8/2022 | Thiebaut | .............. | H04W 48/18 |
| 2022/0377819 A1* | 11/2022 | Zhou | .................... | H04W 76/11 |

OTHER PUBLICATIONS

3GPP, TS 23.502 v17.2.0—Technical Specification Group Services and System Aspects; Procedures for the 5G System (5GS); Stage 2, Release 17 (Sep. 2021).

3GPP, TS 23.501 v17.6.0—Technical Specification Group Services and System Aspects; System and Architecture for the 5G System (5GS); Stage 2, Release 17 (Sep. 2021).

3GPP, TS 23.316 v16.5.0—Technical Specification Group Services and System Aspects; Wireless and Wireline Convergence Access Support for the 5G System (5GS); Stage 2, Release 16 (Sep. 2020).

RFC 8200, Deering, S., et al., "Internet Protocol, Version 6 (IPv6) Specification," Internet Engineering Task Force (IETF), , ISSN: 2070-1721, Jul. 2017.

RFC 791: Internet Protocol, Darpa Internet Program Protocol Specification, Defense Advanced Research Projects Agency Information Processing Techniques Office, pp. 1-49, Sep. 1981.

* cited by examiner

GATEWAY DEVICE, SYSTEM AND METHOD FOR PROVIDING A FORWARDING POLICY

RELATED APPLICATION

This application claims priority under 35 U.S.C. § 119 or 365 to European Application No. 21206056.0, filed Nov. 2, 2021. The entire teachings of the above application are incorporated herein by reference.

TECHNICAL FIELD

The present disclosure relates to a gateway device, session management system, access and mobility system, policy control system and method for providing a forwarding policy to a gateway device over a telecommunications network, such as a 5G telecommunications network.

BACKGROUND

Home devices are usually connected to the internet via a device referred to as gateway device or residential gateway device, such as the 5G residential gateway (5G-RG). The gateway device provides a local network and assigns IP addresses to devices connected to the local network. The gateway device also routes data traffic in and out of the local network. The gateway device may contain a wireless access part, using e.g. WiFi access technology. Such gateway devices may register as a user device with the 5G core (5GC) network and act as a gateway for protocol data units, PDUs, by requesting establishment of a PDU session to a session management system in the 5GC. The UEs behind the gateway device can have a connection to a data network via the gateway device without needing to register to the 5GC. In this manner, the devices behind the gateway can have a connection to a Data Network (DN) via the 5G-RG without being registered in the 5GC. 3GPP TS 23.316 v16.5.0 specifies such a network arrangement.

The Network Enhanced Residential Gateway (NERG) is an upgrade to the existing residential gateway, where a part of the functionality of the gateway is virtualized and placed in the telecommunications network. With NERG, the on-premises user device consists of a Bridged Residential Gateway (BRG) connected over a logical subscriber link (LSL) to a virtual gateway deployed in the telecommunications network at a point-of-presence (PoP) operator site. By deploying gateway functionality in the network, management, maintenance and troubleshooting operations are facilitated for the operator.

The NERG upgrade is only feasible for a 5G-RG if, as a UE, the 5G-RG uses an Ethernet PDU Session facilitating the connection to the virtual gateway. However, when the virtual gateway is arranged more centrally in the telecommunications network, very large broadcast/multicast domains are created because the Ethernet connection allows transmitting frames across a whole Ethernet segment.

SUMMARY

The inventors have realized that it is desirable to manage forwarding behavior of the gateway device to protect the telecommunications network and avoid unnecessary use of resources within the telecommunications network.

To that end, one aspect of the disclosure pertains to a gateway device for use in a telecommunications network, wherein the telecommunications network comprises a policy control system configured to provide at least one forwarding policy to the gateway device. The gateway device may be configured to forward traffic of at least one user device connected to the gateway device to the telecommunications network.

The gateway device is further configured to receive the forwarding policy from the policy control system over the telecommunications network. Since the policy control system is operated by the operator of the telecommunications network, the operator can manage forwarding behavior of the gateway device for traffic from the user device connected to the gateway device toward the telecommunications network. The gateway device enforces the received forwarding policy when forwarding traffic of the at least one user device towards the telecommunications network.

In one example, the gateway device is configured to receive the forwarding policy in a protocol data unit, PDU, session establishment procedure. With the PDU session establishment procedure, the gateway device obtains a data connection to the telecommunications network so that the forwarding policy can be delivered to the gateway device efficiently within the existing procedure and in time.

In another example, the gateway device is configured to receive the forwarding policy in a PDU session modification procedure. With the PDU session modification procedure, an existing PDU session may be modified and can now be used to receive a forwarding policy or update an existing forwarding policy in the gateway device.

In yet another example, the gateway device is configured to receive the forwarding policy in a registration procedure for registering the gateway device as a user equipment in the telecommunications network. In the registration procedure, the forwarding policy may be obtained prior to establishing a PDU session which is advantageous in some instances. For example, the gateway device may then enforce the obtained forwarding policy for one or more PDU sessions established by the gateway device.

Another aspect of the disclosure relates to a system in a telecommunications network configured to receive at least one forwarding policy from a policy control system for transmission to a gateway device that enforces the forwarding policy in relation to traffic forwarded from a connected user device to the telecommunications network. Since the policy control system is operated by the operator of the telecommunications network, the operator can manage forwarding behavior of the gateway device for traffic from the user device connected to the gateway device toward the telecommunications network.

In one example, the system in the telecommunications system pertains to a session management system configured to receive a forwarding policy for a gateway device from a policy control system. The session management system may be configured to provide the forwarding policy to the gateway device in a protocol data unit, PDU, session establishment procedure or in a PDU session modification procedure with the session management system. The forwarding policy may be provided from the session management system via an access and mobility system of the telecommunications network. This provides an effective manner for providing the forwarding policy to the gateway device or updating the forwarding policy.

In another example, the system in the telecommunications system pertains to an access and mobility system configured to receive a forwarding policy for a gateway device from a policy control system. The access and mobility system may be configured to provide the forwarding policy to the gateway device in a registration procedure of the gateway device in the telecommunications network with the access and mobility system. In the registration procedure, the forwarding policy may be provided to the gateway device prior to establishment of a PDU session which is advantageous in some instances. For example, the gateway device may then enforce the obtained forwarding policy for one or more PDU sessions established by the gateway device.

Still another aspect of the disclosure relates to a policy control system configured to provide at least one forwarding policy for a gateway device to control traffic for at least one user device connected to the gateway device. In one example, the policy control system generates the forwarding policies based on higher-level information. The policy control system is configured to provide the forwarding policy to the gateway device, possibly via other systems in the telecommunications network, such as a session management system and/or an access and mobility system. Since the policy control system is operated by the operator of the telecommunications network, the operator can manage forwarding behavior of the gateway device for traffic from the user device connected to the gateway device toward the telecommunications network.

In one example, the forwarding policy for the gateway device may be transmitted to a session management system using a policy association establishment procedure within a protocol data unit, PDU, session establishment procedure. With the PDU session establishment procedure, the gateway device obtains a data connection to the telecommunications network so that the forwarding policy can be delivered to the gateway device efficiently within the existing procedure and in time.

In another example, the forwarding policy for the gateway device may be transmitted to a session management system using a policy association modification procedure within a PDU session modification procedure. With the PDU session modification procedure, an existing PDU session may be modified and can now be used to receive a forwarding policy or update an existing forwarding policy.

In yet another example, the forwarding policy for the gateway device may be transmitted to an access and mobility system using a UE policy association establishment in registration of the gateway device in the network. In the registration procedure, the forwarding policy may be obtained prior to establishing a PDU session which is advantageous in some instances.

A further aspect of the disclosure pertains to a message for a telecommunications network, wherein the message is at least one of a protocol data unit, PDU, session establishment accept message, a PDU session modification command message or a message in a UE configuration update procedure carrying at least a portion of at least one forwarding policy for the gateway device as described herein.

A still further aspect of the disclosure relates to a method in a gateway device for use in a telecommunications network, wherein the telecommunications network comprises a policy control system configured to provide a forwarding policy to the gateway device, wherein the gateway device is configured to forward traffic of at least one user device connected to the gateway device to the telecommunications network. The method includes the step of receiving the policy from the policy control system over the telecommunications network. The method may further include the step of enforcing the received forwarding policy when forwarding traffic of the at least one user device towards the telecommunications network.

In one example, the gateway device performs the step of receiving the forwarding policy in a protocol data unit, PDU, session establishment procedure. With the PDU session establishment procedure, the gateway device obtains a data connection to the telecommunications network so that the forwarding policy can be enforced on the traffic over the data connection from at least one user device to the telecommunications network.

In another example, the gateway device performs the step of receiving the forwarding policy in a PDU session modification procedure. With the PDU session modification procedure, an existing PDU session may be modified and can now be used to enforce a forwarding policy or update an existing forwarding policy in the gateway device.

In yet another example, the gateway device performs the step of receiving the forwarding policy in a registration procedure for registering the gateway device as a user equipment in the telecommunications network. In the registration procedure, the forwarding policy may be obtained prior to establishing a PDU session which is advantageous in some instances. For example, the gateway device may then enforce the obtained forwarding policy for one or more PDU sessions established by the gateway device.

In one example, the step involves a session management system providing the forwarding policy to the gateway device in a protocol data unit, PDU, session establishment procedure or a PDU session modification procedure with the session management system. The forwarding policy may be provided from the session management system via an access and mobility system of the telecommunications network. The method may also involve receiving a forwarding policy from a policy control system. This provides an effective manner for providing the forwarding policy to the gateway device or updating the forwarding policy.

In another example, the step involves an access and mobility system providing the forwarding policy to the gateway device in a registration procedure of the gateway device with the access and mobility system. The method may also involve receiving a forwarding policy from a policy control system. In the registration procedure, the forwarding policy may be provided to the gateway device prior to establishment of a PDU session which is advantageous in some instances. For example, the gateway device may then enforce the obtained forwarding policy for one or more PDU sessions established by the gateway device.

Another aspect of the disclosure entails a method in a policy control system configured to provide at least one forwarding policy for a gateway device to control traffic for at least one user device connected to the gateway device. In one example, the policy control system generates the forwarding policies based on higher-level information.

The method includes the step of providing the forwarding policy to the gateway device, possibly via other systems in the telecommunications network, such as a session management system and/or an access and mobility system. Since the policy control system is operated by the operator of the telecommunications network, the operator can manage forwarding behavior of the gateway device for traffic from the user device connected to the gateway device toward the telecommunications network.

In one example, the method includes the step of transmitting the forwarding policy for the gateway device to a session management system using a policy association establishment procedure within a protocol data unit, PDU, session establishment procedure. With the PDU session establishment procedure, the gateway device obtains a data connection to the telecommunications network so that the forwarding policy can be enforced on the traffic over the data connection from at least one user device to the telecommunications network.

In another example, the method includes the step of transmitting the forwarding policy for the gateway device to a session management system using a policy association modification procedure within a PDU session modification procedure. With the PDU session modification procedure, an existing PDU session may be modified and can now be used to enforce a forwarding policy or an updated existing forwarding policy.

In yet another example, the method includes the step of transmitting an access and mobility system using a UE policy association establishment in registration of the gateway device in the network. In the registration procedure, the forwarding policy may be obtained prior to establishing a PDU session which is advantageous in some instances.

The disclosure also pertains to a computer program comprising software code portions that, when run on a computer system, cause the computer system to perform one or more of the steps of the methods as described herein.

The disclosure also pertains to a communication system comprising the gateway device as described herein, at least one of the session management system and the access and mobility system as described herein and the policy control system as described herein.

It should be appreciated that forwarding policies comprise one or more forwarding rules allowing, modifying or blocking traffic (PDUs) from user devices connected to the gateway device. In one example, the gateway device provides a household network or company network enabling devices within this local network to connect to the telecommunications network to obtain services from within or external to this telecommunications network through the gateway device.

It should be noted that it is known from the prior art to send UE Route Selection Policy (URSP) rules from a policy control system in a telecommunications network to a user device. These URSP rules, however, have limited matching capabilities and do not allow to control forwarding, such as blocking, of any traffic from a user device connected to the UE as the skilled person will appreciate from 3GPP TS 23.503, version 17.2.0.

It should be noted that the forwarding policies as described in the present disclosure may be provided to the gateway device as a separate policy or as an extension of the URSP rules.

It should be noted that the forwarding policy refers to information enabling the gateway device to enforce forwarding rules on data traffic arriving at the gateway device, which may involve prior processing of the information in the gateway device or an intermediate system within the telecommunications network.

It should also be noted that the gateway device may register or may be registered as a user equipment in the telecommunications network.

Furthermore, it should be noted that the telecommunications network may comprise a 5G telecommunications network as standardized by 3GPP.

In one embodiment, the gateway device is configured to transmit a PDU session establishment request to the telecommunications network for establishing a PDU session with the telecommunications network. The gateway device may be configured to receive the forwarding policy with a PDU session establishment accept message from the telecommunications network, e.g., from a session management system in the telecommunications network. The gateway device may then enforce the forwarding policy received with the PDU session establishment accept message when forwarding traffic of the at least one user device towards the telecommunications network.

Likewise, a session management system is disclosed configured to transmit the forwarding policy to the gateway device in a PDU session establishment accept message. The PDU session establishment accept message may be triggered by the PDU session establishment request from the gateway device and provides for an efficient and timely manner to obtain a forwarding policy associated with the requested PDU session.

In one embodiment, the gateway device is configured to receive a PDU session modification command message comprising the forwarding policy or information for updating the forwarding policy in the gateway device from the telecommunications network, e.g., from a session management system in the telecommunications network.

Likewise, a session management system is disclosed configured to transmit information for updating the forwarding policy in the gateway device to the gateway device in a PDU session modification command message. The gateway device may then enforce the forwarding policy or updated forwarding policy when forwarding traffic of the at least one user device towards the telecommunications network.

The PDU session modification procedure may either be triggered from the telecommunications network or from the gateway device.

In the latter case, a PDU session modification request from the gateway device may trigger receiving the PDU session modification command message comprising the information for receiving or updating the forwarding policy in the gateway device. A PDU session modification procedure initiated from the gateway device may be useful when, for example, new user devices connect to the gateway device, for example in the home or company network. The obtained forwarding policy may then also apply to the new user device.

A PDU session modification procedure initiated from the telecommunications network may be useful when either the network operator or the user provisions updated forwarding policies in the policy control system that should be delivered to the gateway device.

In one embodiment, the gateway device may be configured to transmit a registration request for initial registration of the gateway device in the telecommunications network. The gateway device may then receive the forwarding policy in a UE configuration update procedure, e.g. with an access and mobility system in the telecommunications network, in response to transmitting the registration request. The gateway device may then enforce the obtained forwarding policy for one or more PDU sessions established by the gateway device.

Likewise, an access and mobility system is disclosed configured to transmit the forwarding policy to the gateway device in a UE configuration update procedure with the gateway device.

By this configuration, the forwarding policy or policies can be obtained prior to establishing a PDU session, so that the forwarding policy is not necessarily associated with only one established PDU session but may be associated with the gateway device irrespective of established PDU session or sessions. In this embodiment, the forwarding policies may be an extension to the UE route selection policy, URSP, rules.

In one particular embodiment, the gateway device may be configured to enforce the forwarding policy received in the UE configuration update procedure prior to any UE route selection policy, URSP. This embodiment provides the advantage of enforcing a single forwarding policy for the gateway device irrespective of the number of PDU sessions allowed by the URSP rules.

In one further embodiment, the gateway device is configured for at least one of the following tasks.

One task pertains to the gateway device registering a source address of at least one user device connected to the gateway device. The gateway device may, for each source address, monitor forwarding behavior and dependent on statistics transmit a notification to the telecommunications network or a user device connected to the gateway device. For example, when a user device is frequently or continuously blocked, the notification may be used to inform the operator of the telecommunications network and/or, optionally via the operator, the owner of the gateway device of the particular user device requiring attention in the forwarding policies. The presentation of the notification to the user can be via email, SMS, visual implementation on the gateway device or website allowing access to the forwarding policy or any other channel.

The notification may be transmitted to the device connected to the gateway device in order to inform the user that certain traffic originating from that device is blocked by a forwarding policy on the gateway device. This notification may, for example, be part of an Internet Control Message Protocol (ICMP) Destination Unreachable message with Code 13 (Communication Administratively Prohibited) sent from the gateway device to the user device. In case ICMP cannot be used (i.e. when only the Ethernet layer is present on the communication link, for example), the gateway device sends an ethernet frame containing a "Frame Filtered" message with (Communication Administratively Prohibited) code. Other ways to convey the message depending on the access type used are not precluded.

Another task again involves the gateway device registering a source address of at least one user device connected to the gateway device. If the source address of the user device is unknown to the gateway device (e.g. when the user device is a new user device or visiting user device), the gateway device may transmit an update request including the device source address for updating the forwarding policy, e.g. using a gateway device initiated PDU session modification request. In one embodiment, the policy control function has been provisioned with the source address and the device type from which the forwarding rules are derived. This may be provisioned by the network operator as part of the subscription data or from higher-level information. In another embodiment, the update request may contain a device type identifier of the user device to easily allow obtaining a forwarding policy for a particular device type from the telecommunications network. A new smart phone will probably require other forwarding policies than an IoT device, so a device type identifier signaling that the connected user device is smart phone or an IoT device may result in obtaining a different forwarding policy or forwarding rule in the gateway device. Yet another possible task of the gateway device storing device type identifiers and associated forwarding policy or rules thereof. These forwarding policy rules may have been obtained from the telecommunications network in a PDU session establishment procedure, a PDU session modification procedure and/or a registration procedure of the gateway device in the telecommunications network. If a new device connects to the gateway device, the gateway device determines the device identifier and associates the new device to a locally stored forwarding policy for the device type. This avoids unnecessary signaling from the gateway device to the telecommunications network.

A further task relates to the gateway device transmitting its own device type identifier, e.g. an identifier interpreted as a gateway device identifier in the telecommunications network, in a request to obtain a forwarding policy or an update thereof. Such a gateway device identifier may be included in a PDU session establishment request, a PDU session modification request and/or a registration request as mentioned above. The gateway device identifier may assist in obtaining the forwarding policy from the telecommunications network.

In one embodiment, the gateway device is configured to be connected to a user plane system in the telecommunications network by means of a protocol stack with a first communication layer for a first communication protocol. The forwarding policy for the gateway device may include at least one forwarding rule that analyzes the header of a data packet according to the first communication protocol, such as Ethernet.

A forwarding policy may contain one or more rules, possibly each with a specified priority. Each rule may comprise a matching part and an action part. The matching part describes, for example, which fields from protocol headers need to have what values for the rule to be applied. In this embodiment, the fields are taken from the Ethernet frame as specified in IEEE 802.3 specifications. Whenever the PDU session has PDU Session Type "Ethernet", matching rules containing any field from the specification can be provided.

The action part of the forwarding rule in the forwarding policy can be either block (drop), forward or mangle (modify).

Whereas the above embodiment is beneficial for a use case wherein the gateway device only has a link layer connection, such as the NERG use case with an Ethernet connection between the BRG as gateway device and the virtual gateway in the telecommunications network, it should be appreciated that other protocols or even a combination of protocols are also possible. Thus, different forwarding rules may be applied to different protocols. Also, forwarding rules on different protocols may be applied sequentially, or a single forwarding rule may be applied to a combination of fields of different protocols. When a PDU Session is of type IPv4 or IPv6 the rules would then comprise or include matching fields from the IETF RFC 791 and 8200 correspondingly. In case of a PDU Session type for dual protocol layers as described in application EP20209377.9 or EP20209384.5, any combination of fields from the two protocols is possible, as long as the 5G-RG has capabilities of processing both.

In one embodiment, the gateway device is configured to modify a PDU based on the forwarding rules obtained from the telecommunications network, wherein, optionally, modifying the PDU comprises adding a VLAN header to the PDU. Such a modifying forwarding rule may be advantageous when specific user devices are connected to the gateway device, e.g. a set-top box, STB.

In one embodiment, the policy control system is configured to determine the forwarding policy to be provided based on at least one of:

a subscription identifier of the gateway device;
  a device type identifier of the gateway device;
  a device type identifier of a user device connected to the
    gateway device; and a source address of a user device connected to the gateway device One way to obtain the forwarding policy from the network is by cooperation with a subscriber register, such as a unified data management system, having a subscription identifier of the gateway device. The identifier may be a SUPI (Subscription Permanent Identifier), SUCI (Subscription Concealed Identifier) or a Generic Public Subscription Identifier, GPSI, in a message from a session management system or an access and mobility management system to a policy control system. The GPSI is provisioned in the unified data management system together with the SUPI (Subscription Permanent Identifier). The policy control system may work with the SUPI or GPSI that is coupled to the forwarding policies.

Device type identifiers of at least one of the gateway device and the user device may assist in obtaining the forwarding policy as described above.

In one embodiment, the forwarding policy to be provided to the gateway device includes at least one of operator-defined rules defined by the operator of the telecommunications network and user-defined rules for specific user devices connected to the gateway device. The operator-defined rules may, for example, comprise blocking all traffic from all user devices to motivate the user of the gateway device to program more specific dedicated rules for one or more user devices connected to the gateway device. To that end, in one embodiment, the policy control system may have a programming interface allowing the user to define the dedicated rules. Such dedicated rules may take precedence over the operator-defined rules. At the same time, the operator may provide restrictions for the dedicated rules to stay in control over the use of the telecommunications network.

As will be appreciated by one skilled in the art, aspects of the present invention may be embodied as a system, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object-oriented programming language such as Java™, Smalltalk, C++ or the like and conventional procedural programming languages, such as the "C" programming language or similar programming languages. The program code may execute entirely on the person's computer, partly on the person's computer, as a stand-alone software package, partly on the person's computer and partly on a remote computer, or entirely on the remote computer or server. In the latter scenario, the remote computer may be connected to the person's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer programs products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

Moreover, a computer program for carrying out the methods described herein, as well as a non-transitory computer readable storage-medium storing the computer program are provided.

Elements and aspects discussed for or in relation with a particular embodiment may be suitably combined with elements and aspects of other embodiments, unless explicitly stated otherwise. Embodiments of the present invention will be further illustrated with reference to the attached drawings, which schematically will show embodiments according to the invention. It will be understood that the present invention is not in any way restricted to these specific embodiments.

BRIEF DESCRIPTION OF THE DRAWINGS

Aspects of the invention will be explained in greater detail by reference to exemplary embodiments shown in the drawings, in which.

DETAILED DESCRIPTION OF THE DRAWINGS

Figure 1A:
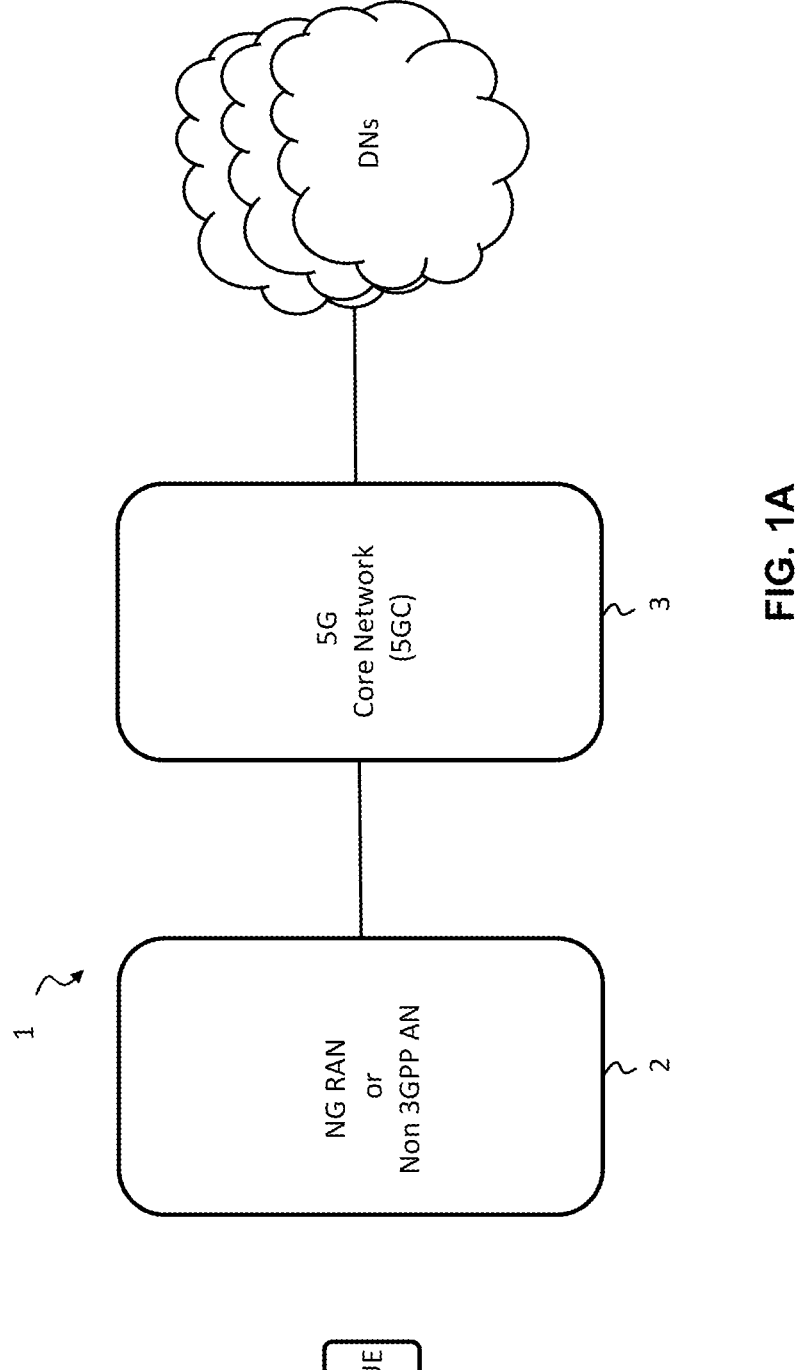
FIG. 1A is a schematic illustration of a 5G network architecture according to the prior art.

FIG. 1A is a schematic illustration of a 5G network architecture 1 according to the prior art. The 5G network is composed of a 5G access network 2 and a 5G core network (5GC) 3. The access network is made up of a new-generation radio access network (NG-RAN) which uses the 5G new radio interface (NR). The NG-RAN comprises 5G base stations, referred to as gNB's (not shown) which are connected to the 5GC and to each other. The access network 2 may comprise a non-3GPP access network (e.g. WiFi, xDSL, etc) connecting to the 5GC. The different network entities are connected by an underlying IP (or other transport technology) transport network. The 5G network architecture is connected to a plurality of data networks DN. Data networks can be the internet, an operator specific network, a dedicated network, etc.

Figures 1B, 1C:
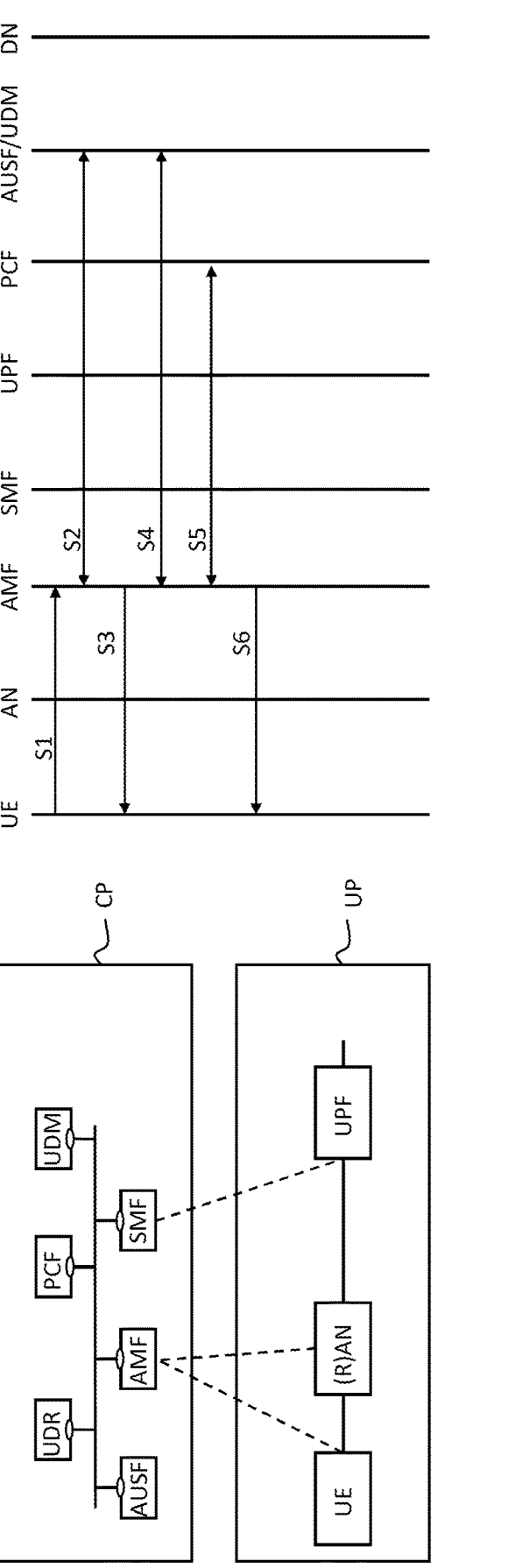
FIG. 1B is a schematic illustration of systems of the user plane and control plane for a 5G telecommunications network and a user equipment.
FIG. 1C is a schematic illustration of some steps of an access and mobility request procedure in a 5G telecommunications network according to the prior art.

FIG. 1B shows a 5G telecommunications network with systems in a 5GC in a service-based architecture in combination with a user device UE and (R)AN. The 5GC comprises many systems that are defined in terms of network functions (NF) that provide services as sets of interactions between two or more network functions. The upper part of FIG. 1B shows a set of network functions that form the 5G control plane CP.

Amongst others, the control plane comprises an access and mobility management function (AMF) system that handles most signalling coming from and going to the UE, hereinafter referred to as access and mobility system. The AMF also interacts with other functions in the control plane, as shown. The system performing the access and mobility function AMF has the responsibility of access control and registration of the UE. Such tasks are typically performed prior to allowing the UE to establish a PDU session with the 5GC.

The AMF does not handle session management but relays session-related messages to and from a system performing a session management function (SMF), hereinafter referred to as session management system. The SMF performs establishment, modification and release of PDU sessions. The control plane also comprises a system performing a policy control function (PCF) that provides policy rules (QoS, filtering, charging) to other control plane functions, such as the SMF. The PCF will herein be referred to as policy control system. The 5G Policy Architecture is defined in more detail in 3GPP TS 23.503.

Further functions that are comprised in the control plane include the unified data management function (UDM) and/or a unified data repository (UDR), also referred to as unified data management system herein, and the authentication server function (AUSF). The UDM is partly the equivalent of the home server system HSS in 3G and 4G networks and is a front end function to the UDR for UE-related information, such as credentials, identifiers, AMF details, and SMF PDU sessions. UDR is a database that provides access to data offered as services to other network systems, PCF The AUSF supports authentication for 3GPP and non-3GPP access.

For the user plane UP, the lower part in FIG. 1B, the UE communicates via the (radio) access network 2, indicated as (R)AN, with a system performing a user plane function (UPF), hereinafter also referred to as the user plane system. Data is tunnelled between the access network and the UPF, sometimes referred to as the NG-U tunnel. The main task of the UPF is to process and forward user data. The UPF is controlled by the SMF and connects with external data networks DN.

The system performing the session management function SMF has the responsibility for setting up connectivity for the UE toward data networks as well as managing the user plane for that connectivity. In order to connect to a DN, the UE requests establishment of a protocol data unit (PDU) Session. The PDU is the basic end-user protocol type carried by the PDU session, e.g. IP packets or Ethernet frames. Each PDU session provides an association between the UE and a specific DN.

A UE needs to register with the telecommunications network to get authorized to receive services, to enable mobility tracking and to enable reachability as set out in 3GPP TS23.502, v17.2.0, clause 4.2. A few steps of the registration procedure are shown in FIG. 10.

In step S1, a UE sends a NAS Registration Request message, a registration request, to the access network which selects an access and mobility system AMF, if no AMF selection is made in the registration request. The registration request contains, amongst others, a registration type (e.g. initial registration or periodic registration update) and a UE identity (e.g. a GUTI). If not yet available, the AMF system may request the SUCI from the UE via NAS message (not shown).

In step S2, the AMF requests UE authentication from an Authentication Server system AUSF that interacts with the UDM system and receives the authentication information and SUPI at the AMF. In step S3 authentication is arranged with the UE.

In step S4, the AMF interacts with the UDM to register with the UDM and obtain subscription data, including access and mobility subscription data, SMF selection subscription data to create a UE context for the UE in the AMF.

In step S5, a policy and charging system PCF is selected and the AMF interacts with the PCF to create an AM policy association and retrieve a UE policy and access and mobility control policy, wherein the PCF responds with the policy association information. This information may include UE Route Selection Policy, URSP, rules. The AMF delivers the URSP rules to the UE without modification, i.e. transparently.

The URSP rules are specific rules sent from the PCF via the AMF to the UE as part of a UE policy. These URSP rules contain traffic descriptors to which route selectors are attached that define specific attributes (session type, access type, etc) for the PDU session to be used for the traffic that matches the descriptor. Their structure is specified in TS 23.503, v17.2.0, clause 6.6.2, UE Route Selection Policy information. As seen in the fields of table 6.6.2.1-2: UE Route Selection Policy Rule, only destination information may be provided for Non-IP traffic for matching. This limits the capabilities of matching and providing granular rules. Furthermore, Table 6.6.2.1-3: Route Selection Descriptor does not provide any way for traffic control other than access type, offload and PDU Session parameters. For example, it is not possible to block any traffic coming from the UE or perhaps even redirect it to other destinations.

In step S6, a NAS Registration Accept message, a registration accept message, is sent to the U E.

It should be noted that further steps may be included in the registration procedure of FIG. 10. For example, if the temporary identifier of the UE, GUTI, is not known in the AMF (either old or new), the AMF may request the UE to send the SUCI using an identity request/response procedure.

Figures 1D, 1E:
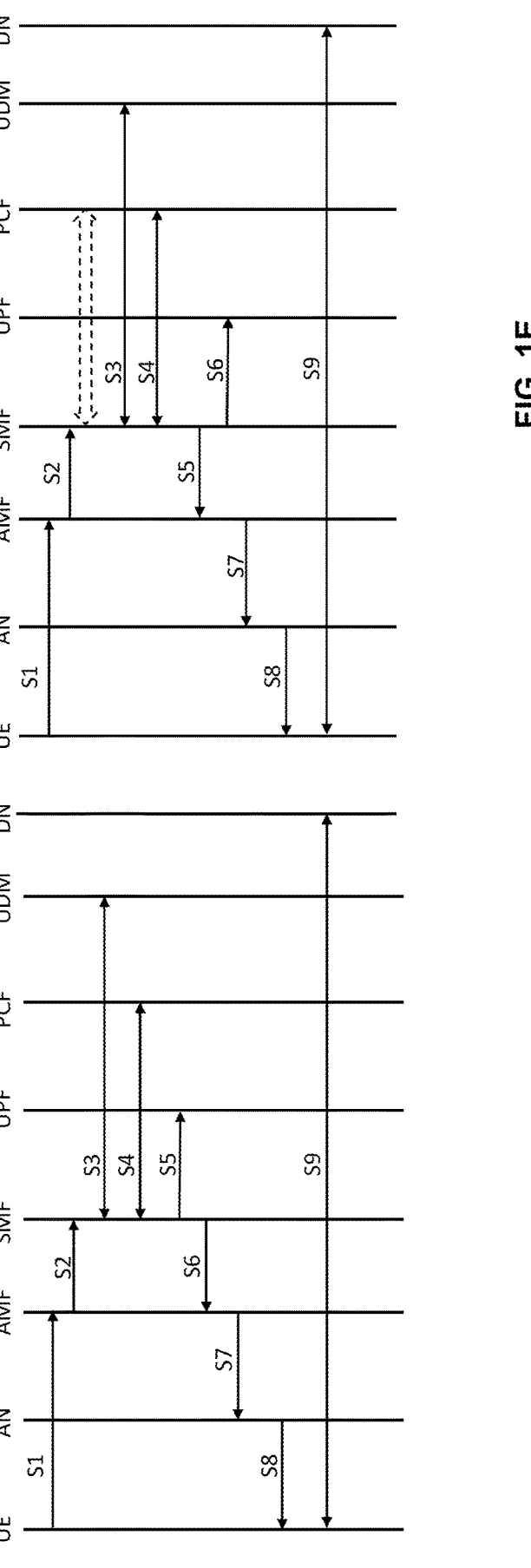
FIG. 1D is a schematic illustration of some steps of a PDU session establishment request procedure in a 5G telecommunications network according to the prior art.
FIG. 1E is a schematic illustration of some steps of a PDU session modification request procedure in a 5G network according to the prior art.

FIG. 1D provides a simplified PDU Session Establishment procedure as set out in more detail in 3GPP TS 23.502, v17.2.0.

In step S1, the UE transmits a PDU Session Establishment Request after the UE is registered with the 5GC sending a registration request to the AMF as shown in FIG. 10. The PDU Session Establishment Request is transmitted as a session management container in a NAS message to the AMF. The PDU Session Establishment Request contains the PDU session ID, the Requested PDU Session Type and, possibly, a data network name (DNN). The PDU Session ID is a unique identifier generated by the UE that is different for different PDU sessions. The Request Type indicates "Initial Request" if the PDU Session Establishment is a request to establish a new PDU session and indicates "Existing PDU Session" if the PDU Session Establishment Request refers to an existing PDU session, for example between 3GPP access and non-3GPP access, or to a PDU Session handover from an existing PDN connection in a 4G EPC. When the access network receives the PDU Session Establishment Request, the NAS message is encapsulated in an N2 message towards the AMF.

The AMF selects an SMF as described in 3GPP TS 23.501 and may either use a DNN provided by the UE or select a (default) DNN using e.g. subscription information from the UDM.

Based on the Request Type, the AMF determines whether the PDU Session Establishment request relates to an existing PDU session or to a new PDU session. In step S2, the AMF sends a message Nsmf_PDUSession_CreateSMContext Request to the SMF containing the PDU Session Establishment Request, DNN information, a PCF ID, etc. when the AMF is not already associated with an SMF. The PCF ID can be used to facilitate selection of the PCF containing the forwarding policy. Else, the AMF sends_PDUSession_UpdateSMContextRequest to the SMF. If the Request Type indicates "Existing PDU Session", the SMF determines that the request is due to switching between 3GPP access and non-3GPP access. The SMF may then identify the existing PDU Session based on the PDU Session ID. In such a case, the SMF does not create a new SM context but instead updates the existing SM context. The request also contains a Requested PDU Session Type field which indicates what type the session should be, i.e. Ethernet, IPv4, IPv6 or IPv4v6.

The SMF may also interact with the UDM and PCF based on the data provided by the UE as can be observed from steps S3 and S4 to obtain subscription data and policy rules. In particular, the SMF may perform an SMF initiated SM Policy Association Modification procedure. The SMF may notify the PCF of the allocated UE IP address or prefix(es). The PCF provides policy information to the SMF in step S4 using the Npcf_SMPolicyControl service that allows the PCF to send new PDU session policies for an established SM session policy association.

In step S5, the SMF interacts with the UPF to establish a session for the user plane. The SMF sends an N4 Session Establishment Request to the selected UPF and provides packet detection, QoS enforcement, forwarding and reporting rules to be installed on the UPF for this PDU Session if the Request Type is "Initial Request". Otherwise, the SMF sends an N4 Session Modification Request. The UPF acknowledges the respective request with an N4 Session Establishment/Modification Response. In this procedure, the SMF obtains tunnel information from the UPF.

In step S6, the SMF interacts with the AMF. Following the successful creation of a tunnel end point, the SMF sends Namf_Communication_N1N2MessageTransfer with tunnel information for N2 message and PDU session details in N1 Container and provides the representation of the SM context or updated SM context to the AMF.

In step S7, the AMF sends a N2 PDU Session Setup Request to the appropriate gNB of the access network AN along with N2 session management parameters received from the SMF as QFIs, QoS Profile. The transmission from the AMF to the access network AN also includes the NAS message destined to the UE, including session parameters like QoS Rules and UE IP address.

The gNB establishes the tunnel based on the information received from the AMF and sets up a tunnel end point and forwards information to the UE for setting up a PDU session in step S8. The gNB also reports back to the AMF that subsequently informs the SMF about the successful setup of the tunnel.

After this step, the tunnel is established and the PDU session exists between the UE and the UPF allowing data transfer with the DN, indicated by step S9.

When an established PDU session already exists, the established PDU session may be modified using a PDU Session Modification procedure. Some steps of a prior art PDU Session Modification procedure are illustrated schematically in FIG. 1E. More detailed information is provided in 3GPP TS 23.502, v17.2.0, clause 4.3.3.2.

In step S1, the UE initiates the PDU Session Modification procedure by the transmission of a NAS message containing a PDU Session Modification Request. The PDU Session Modification Request contains, amongst others, the PDU session ID indicating the PDU session to be modified. The NAS message containing the PDU Session Modification Request is forwarded by the (R)AN to the AMF.

In step S2, the AMF transmits a message to the SMF by invoking Nsmf_PDUSession_UpdateSMContext to update the session management context of the UE in the session management system. Upon receipt of the message, the SMF starts the PDU session modification.

Steps S3 and S4 show the SMF communicating with the UDM resp. PCF to update subscription data and report subscribed events if needed and to receive policy control information, including updates, from the PCF.

In step S5, the SMF responds to the AMF with a message comprising N2 SM information for the AMF and an N1 SM container for the UE. The N2 SM information carries the information that the AMF must provide to (R)AN. It can include a QoS configuration file and corresponding QFI to notify (R)AN that one or more QoS flows have been added or modified. The N1 SM container carries the PDU session modification command that the AMF must provide to the UE. It may include QoS rules, QoS flow-level QoS parameters required by QoS flows associated with QoS rules, and corresponding QoS rule operations and QoS flow-level QoS parameter operations to notify the UE that one or more QoS rules have been added or deleted or modified.

In step S6, the SMF updates the UPF(s) that are involved by the PDU Session Modification by sending N4 Session Modification Request message(s) to the UPF. For example, the SMF may add, change or remove packet detection rules and/or forwarding rules or parts thereof at the UPF.

In step S7, the AMF sends a N2 PDU Session Resource Modification Request to the appropriate gNB of the access network AN along with N2 session management parameters received from SMF that changed as part of the modification procedure, i.e SDFs, QoS flows. The transmission from the AMF to the access network AN also includes the NAS message PDU Session Modification Command destined to the UE as a response to the PDU Session Modification Request in S10, including any session management parameters that are allowed by the network to change.

The gNB modifies the UE PDU Session Resource accordingly and also propagates any change to the UE on the access network level in S9 if applicable.

It should be noted that, while FIG. 1E illustrates UE requested PDU session modification, a modification may also be requested from the network side, as indicated by the dashed arrow, for example from the PCF.

Figure 2A:
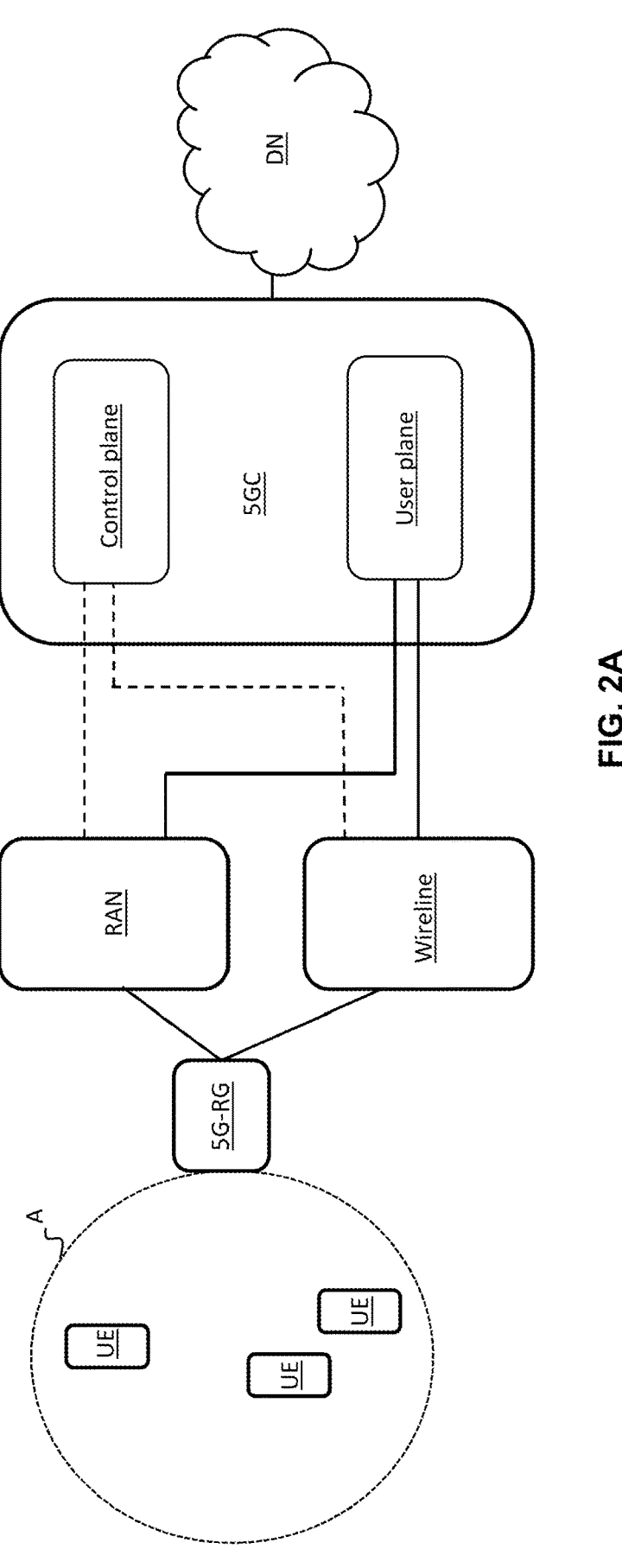
FIG. 2A is a schematic illustration of a local network comprising a 5G-RG providing wireless coverage for a plurality of UEs connected to a 5GC via either wireline or wireless connections according to a disclosed embodiment.

FIG. 2A is a schematic illustration of a use case with a local network comprising a gateway device, such as a 5G Residential Gateway (5G-RG), providing wireless coverage in an area A for a plurality of UEs connected to a 5GC via either a wireline access network or a wireless access network containing gNBs. The 5G-RG may connect to the 5GC as a UE in a manner corresponding to FIG. 1C or FIG. 1D interacting with functions in the control plane and user plane and forwards traffic to and from the UEs in the local network via the PDU session. The 5G-RG may assign addresses, e.g. IP addresses, to UEs in the local network. In this manner, the UEs behind the 5G-RG can make use of a single PDU session of the 5G-RG for a data network DN without being registered in the 5GC and using the IP address assigned by the telecommunications network to the 5G-RG. When the UE is associated with/connected to the 5G-RG, using Ethernet, Zigbee, WiFi or Bluetooth, for example, all types of traffic may be routed via the 5G-RG PDU Session towards the data network DN via a 5G-RAN or via wireline access and the 5GC.

Figure 2B:
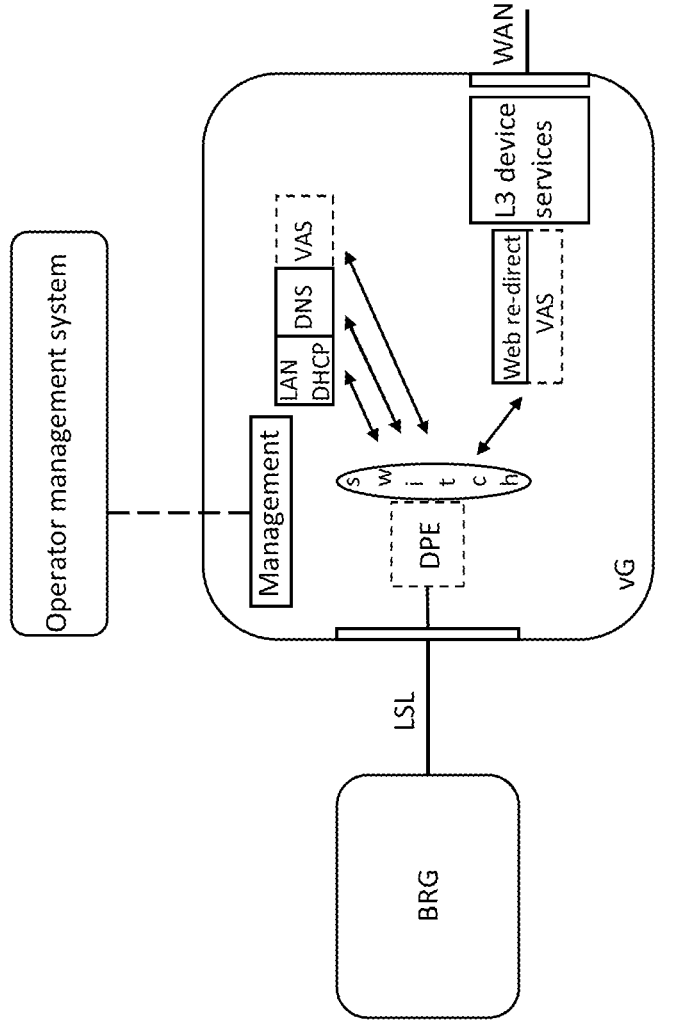
FIG. 2B is a schematic illustration of a NERG deployment comprising an on-premises Bridged Residential Gateway (BRG) and a virtual Gateway (vG) deployed in a telecommunications network.

The Network Enhanced Residential Gateway (NERG) is an upgrade to the existing residential gateway, where a part of the functionality of the gateway is virtualized and placed in the telecommunications network as shown in FIG. 2B. With NERG, the on-premises user device consists of a Bridged Residential Gateway (BRG) connected over a logical subscriber link (LSL) to a virtual gateway vG deployed in the telecommunications network at a point-of-presence (PoP) operator premise. By deploying gateway functionality in the network, management, maintenance and troubleshooting operations are facilitated by the operator.

To that end, the virtual gateway vG has a management interface over which the operator can manage operations. The vG has device policy enforcement functionality (DPE) to enforce policies that may be configured from the operator. The vG also comprises switching functionality to switch traffic for a first communication protocol and a second communication protocol. In the embodiment shown in FIG. 2B, layer-2 services, such as DHCP and DNS are shown in combination with value-added services (e.g., for smart home control) as associated with a first communication protocol. The vG is connected to a wide area network WAN for layer-3 traffic. The vG may provide local layer-3 services, such as, for example, DDoS prevention and firewalling.

The NERG upgrade is only feasible for a 5G-RG if, as a UE, the 5G-RG uses an Ethernet PDU Session facilitating the connection to the virtual gateway. However, when the virtual gateway is arranged more centrally in the telecommunications network, very large broadcast/multicast domains are created because of the Ethernet connection allows transmitting frames across a whole Ethernet segment.

The present disclosure provides a solution for obtaining a forwarding control policy in the 5G-RG to enhance operator control and additional user control of outgoing traffic of the 5G-RG.

As a use case, the disclosure will focus on a 5G-RG user device. It should be appreciated, however, that the disclosure has a more general scope of obtaining of enhancing control of the use of resources in the telecommunications network.

Several embodiments of the disclosed invention will now be described with reference to FIG. 3A.

Figure 3A:
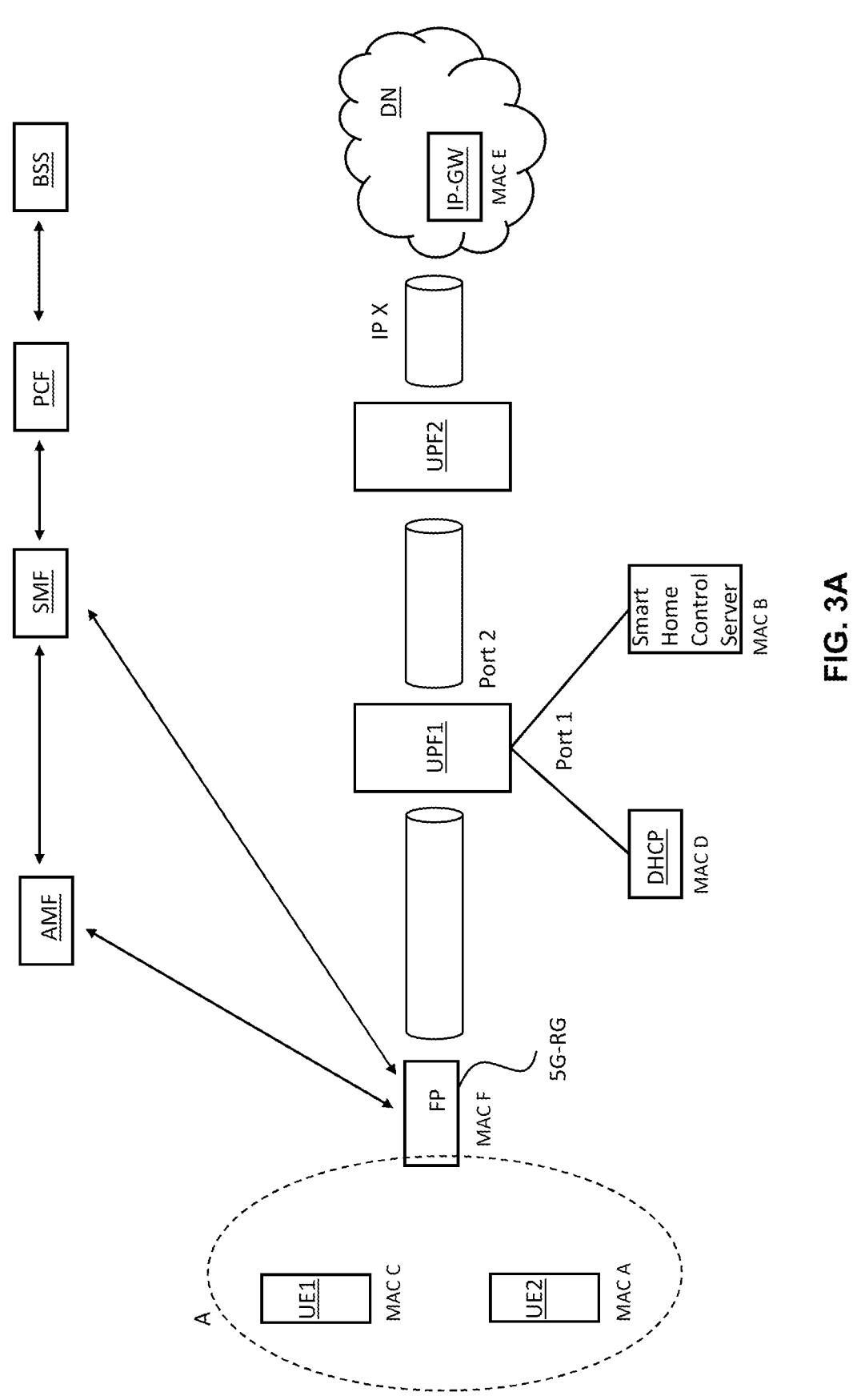
FIG. 3A is a schematic illustration of a gateway device provided with a forwarding policy from the telecommunications network enabling control of transmissions of user devices via the gateway device onto the telecommunications network.

The system of FIG. 3A comprises a gateway device, embodied as a 5G-RG, and a telecommunications network. The telecommunications network comprises a policy control system PCF that is configured to provide a forwarding policy FP to the 5G-RG. The 5G-RG is configured to forward traffic of user devices, for example UE1 and UE2, to the telecommunications network. The 5G-RG has a subscription in the UDR (fetched from the AMF and SMF via the UDM) of the telecommunications network and a UPF traffic forwarding policy in the PCF that may e.g. describe the DNAI where the splitting of traffic should take place (see 3GPP TS 23.501 using a UL Classifier for a PDU session). The UPF traffic forwarding policy may also be provisioned in the PCF or may be bound to the 5G-RG via the subscription in the UDR and, possibly, its MAC address. The UPF traffic forwarding policy is sent to the SMF and used to derive and send forwarding rules to UPF1 and UPF2 so traffic with particular destination (e.g. Smart Home Control Server) is forwarded correspondingly. The UPF traffic forwarding policy is different from the forwarding policy FP in the gateway device which is the subject of the present disclosure.

The user devices UE1 (e.g. a smartphone) and UE2 (e.g. an IoT device) are connected to the gateway device via a local network (indicated by the dashed area A showing coverage by the local network). The connection between the user devices UE1, UE2 can be via any connection, including WiFi, Bluetooth, 3GPP LTE or NR sidelink.

In one embodiment, the 5G-RG may have a first communication layer for a first communication protocol towards UPF1, whereas UE1 and/or UE2 may also have high communication layers in the local network, such as a second communication layer for a second communication protocol such as IP. The UEs in the coverage area A of the 5G-RG may, e.g. be IP-communication capable devices, whereas the 5G-RG only has an Ethernet connection to the telecommunications network, as may be the case for the NERG deployment. UPF1 provides local services via port1, such as DHCP and a smart home control server provided in the telecommunications network.

In the control plane, the telecommunications system comprises an access and mobility system AMF and a session management system SMF. The SMF is configured to exchange policy control information with the policy control system PCF. Policy control system PCF may provide an interface to a business support system BSS that allows users to program forwarding rules or forwarding policies to be generated in the PCF. The 5G-RG may interact with the AMF and/or SMF to obtain a forwarding policy of the 5G-RG to control transmissions of the user devices UE1, UE2 onto the telecommunications network.

The forwarding policy FP enables the gateway device to control traffic transmission over the telecommunications network via user plane system UPF1 and/or UPF2. Since the forwarding policy is, for example at least partly, configured by the operator of the telecommunications network, the network operator can control transmission of traffic.

The forwarding policy FP for controlling traffic of the connected device is obtained by the 5G-RG from the telecommunications network, such as from the AMF or from the SMF. For example, the forwarding policy may be obtained in a protocol data unit, PDU, session establishment procedure or a PDU session modification procedure with the SMF or in a registration procedure with the AMF to register the gateway device in the telecommunications network.

The forwarding policies may comprise sets of one or more forwarding rules or be extensions of the URSP rules with matching fields and forwarding action options. These can be provisioned by the network operator based on the UE type being a 5G-RG. Furthermore, there can be baseline rules that the operator creates and provides by default, but users can provision their own more specific rules via a self-service portal using the BSS that would govern their local network with UE1 and UE2. Doing this will prevent their traffic from exiting the local network when this is not required. Another problem that can be solved with a forwarding policy is that the 5G-RG can no longer send Ethernet multicasts or broadcasts which will span at least to the UPF1 due to matching address rules of the forwarding policy FP provided by the operator or any other request rules that need messages sent to multiple entities on the same network like UPnP or group management protocols (destination addresses are multicast/broadcast addresses).

Allowing only devices in the local network of the gateway device that are using the services via the UPF to send multicast/broadcasts can prevent that each broadcast/multicast is forwarded onto the UPF in an uncontrolled fashion. This advantage can be obtained by adding (manually or automatically, e.g. via self-service network operator portal and BSS systems) a policy in the PCF containing, for example, the MAC addresses of the devices allowed to access the services. The PCF then creates a rule that blocks all broadcast and multicast traffic except from the designated user devices UE1, UE2 by creating the necessary traffic descriptors. This effectively adds the functionality to blackhole Ethernet broadcast traffic except from the provisioned MAC addresses. It prevents unnecessary traffic from being sent to the UPF or further, effectively creating an outbound firewall on the 5G-RG.

Aside from only spending resources on traffic that is allowed by the forwarding policy, this feature can also be used as a more flexible firewall service that the network provider can offer to customers. This differs from normal firewall services because the rules are actually enforced on the 5G-RG, giving customers opportunities to firewall even local services like smart home control for parental control reasons, amongst others. The operator benefits from this because the operator does not have to transport traffic that will be firewalled on the exit of the network anyway. Since charging is also based on the transported amount of traffic, customers benefit from cheaper connectivity.

As an example, the following forwarding policy FP may be obtained in the gateway device and be defined as forwarding rules in terms of MAC address (SRC for source, DST for destination):

| | | |
|---|---|---|
| 1. | SRC MAC C, DST MAC ff:ff:ff:ff:ff:ff | → allow |
| 2. | SRC MAC A, DST MAC B | → allow |
| 3. | SRC MAC C, DST MAC E | → allow |
| 4. | SRC MAC *, DST MAC E | → block |
| 5. | SRC MAC *, DST MAC * | → block |
| 6. | SCR MAC F, DST MAC * | → allow |

In the forwarding policy FP, specific rules take precedence over general rules. The MAC addresses of some devices are indicated below the devices in FIG. 3A. The MAC address of the DHCP server and the smart home control server in the network are provisioned from the network operating in the 5G-RG.

Rule 1 enables UE1 to perform a DHCP broadcast. Rule 2 enables UE2 to access the smart home control server on port 1 of UPF1. Rule 3 enables UE1 to access the IP gateway to get internet access via data network DN. Rule 4 forbids any other device in the local network of the gateway 5G-RG to access the IP gateway. Rule 5 is a general rule blocking all traffic from any device to any other device. Rule 6, however, enables the gateway device itself to access any other device.

The action part of the forwarding rule in the forwarding policy can be either block (drop), forward (allow) or mangle (modify).

Whereas the above embodiment is beneficial for a use case wherein the gateway device only has a link layer connection, such as the NERG use case with an Ethernet connection between the BRG as gateway device and the virtual gateway in the telecommunications network, it should be appreciated that other protocols or even a combination of protocols are also possible. Thus, different forwarding rules for the forwarding policy FP may be applied to different protocol layers or different protocols. Also, forwarding rules on different protocols may be applied sequentially, or a single forwarding rule may be applied to a combination of fields of different protocols. When a PDU Session is of type IPv4 or IPv6 the rules would then comprise or include matching fields from the IETF RFC 791 and 8200 correspondingly. In case of a PDU Session type for dual protocol layers as described in application EP20209377.9 or EP20209384.5, any combination of fields from the two protocols is possible, as long as the 5G-RG has capabilities of processing both.

The forwarding policy FP may be provided to and obtained by the gateway device from the telecommunications network.

Figure 3C:
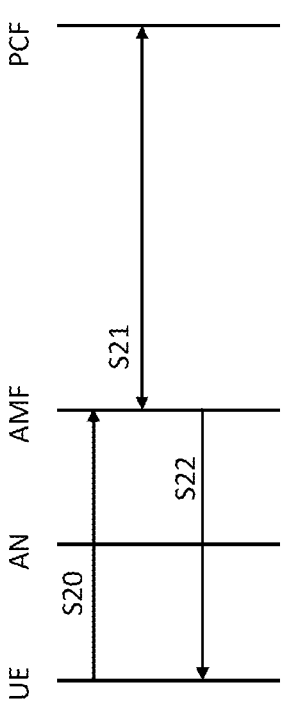
FIG. 3C is a schematic illustration of some steps of a registration procedure of the gateway device to obtain the forwarding policy in the gateway device according to FIG. 3A.
Figure 3D:
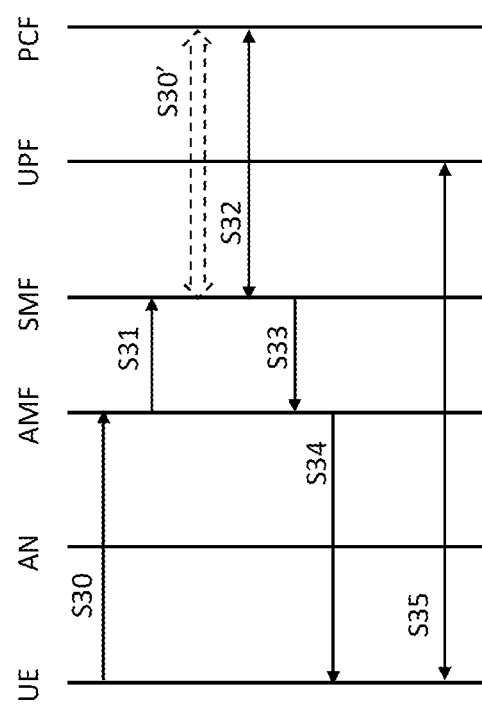
FIG. 3D is a schematic illustration of some steps of a PDU session modification procedure of the gateway device or from the network to obtain the forwarding policy in the gateway device according to FIG. 3A.
Figure 3B:
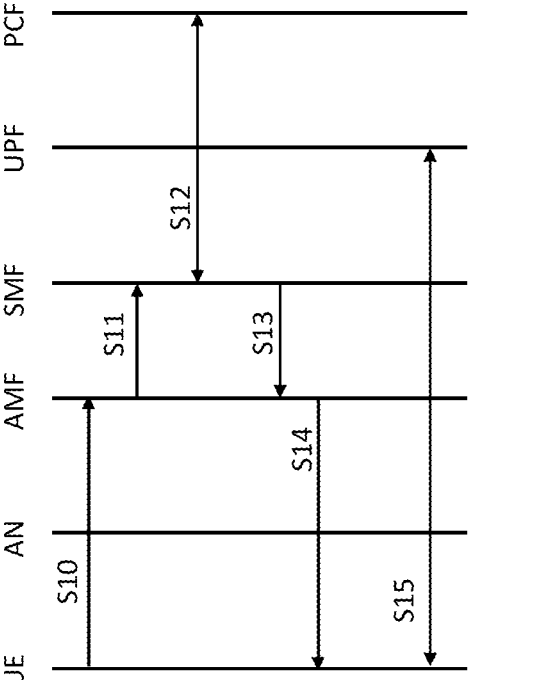
FIG. 3B is a schematic illustration of some steps of a PDU session establishment procedure of the gateway device to obtain the forwarding policy in the gateway device according to FIG. 3A.

In one example, the 5G-RG is configured to receive the forwarding policy FP in a protocol data unit, PDU, session establishment procedure as shown in FIG. 3B. In this example, the 5G-RG may already be registered in the telecommunications network using a registration procedure, such as the procedure described with respect to FIG. 10. In FIG. 3B, only some steps relevant for providing the forwarding policy to the 5G-RG are shown. Further steps of the PDU session establishment procedure have been described with respect to FIG. 1D and still further details and steps are described in 3GPP TS 23.502, v17.2.0. With the PDU session establishment procedure, the 5G-RG obtains a data connection to the telecommunications network so that the forwarding policy can be enforced on the traffic over the data connection from at least one user device to the telecommunications network.

In particular, the 5G-RG is configured to transmit a PDU session establishment request S10 to the telecommunications network for establishing a PDU session with the telecommunications network to the SMF. In step S11, the SMF receives the request from the AMF which triggers a Session Management (SM) Policy Association Establishment for the PDU session with the PCF, step S12. The PCF receives the SM Policy Association Establishment and determines whether a forwarding policy exists for the 5G-RG based on, for example, the subscription of the 5G-RG in the network, the operator provisioned policy data in the PCF or higher-level information provided in the programmable interface of the PCF. Based on this policy data, the PCF generates the forwarding policy rules for the forwarding policy FP to be delivered to the 5G-RG.

In steps S13, S14 the SMF sends the forwarding policy transparently through the AMF and AN to the 5G-RG in a PDU session establishment accept message. The 5G-RG may then enforce the forwarding policy received with the PDU session establishment accept message when forwarding traffic of the at least one user device UE1, UE2 towards the telecommunications network in step S15.

In another example, the 5G-RG is configured to receive the forwarding policy FP in a registration procedure with the telecommunications network as shown in FIG. 3C. In this example, the 5G-RG is not yet registered in the network. FIG. 3C only shows some steps relevant to providing the forwarding policy FP to the 5G-RG. Further steps of the registration procedure have been described with respect to FIG. 10 and still further details and steps are described in 3GPP TS 23.502, v17.2.0. By using the registration procedure, the forwarding policy or policies can be obtained prior to establishing a PDU session, so that the forwarding policy is not necessarily associated with only one established PDU session but may be associated with the 5G-RG irrespective of established PDU session or sessions as will be described in further detail with reference to FIG. 4. In this embodiment, the forwarding policy or policies may be an extension to the UE route selection policy, URSP, rules as described above with reference to FIG. 10.

In particular, the 5G-RG is configured to transmit a registration request for initial registration of the gateway device to the AMF in the telecommunications network in step S20. In step S21, the AMF performs an AM Policy Association Establishment/Modification procedure with the PCF and may obtain the forwarding policy applicable to the 5G-RG. The PCF triggers a UE Configuration Update procedure and sends the forwarding policy to the 5G-RG via the AMF in step S22. The 5G-RG has obtained the forwarding policy independent of a PDU session and may apply the forwarding policy for one or more PDU sessions to be established thereafter.

Irrespective whether a forwarding policy FP is obtained using a PDU session establishment procedure as exemplified in FIG. 3B or using a registration procedure as exemplified in FIG. 3C, it may be useful to update or obtain a new forwarding policy in case of certain events. Such a forwarding policy (update) may be obtained from the telecommunications network.

In one example, the 5G-RG is configured to receive the forwarding policy in a PDU session modification procedure as shown in FIG. 3D. With the PDU session modification procedure, an existing PDU session may be modified and such a modification procedure can now be used to receive a forwarding policy FP or update an existing forwarding policy FP in the 5G-RG. It should be noted that the PDU session modification procedure may be used for the sole purpose of obtaining or updating the forwarding policy while maintaining the other parameters of the PDU session. Of course, the PDU session modification procedure may also be used to obtain or update a forwarding policy in the gateway device in parallel with adjusting parameter of the PDU session.

A PDU session modification procedure has been described with reference to FIGS. 1E and 1n more detail in 3GPP TS 23.503, v17.2.0. In FIG. 3D, only some steps relevant for providing the forwarding policy to the 5G-RG are shown.

In particular, a PDU session modification request is received via the AMF at the SMF from either the 5G-RG or from the network in steps S30, S31, which results in a Session Management (SM) Policy Association Modification for the PDU session with the PCF, step S32. Alternatively, the network may trigger a PDU session modification procedure, using a PCF triggered SM Policy Association Modification, step S30'. The PCF provides the forwarding policy FP or an update thereof and provides the same to the 5G-RG in a PDU session modification command message via the AMF, steps 33, 34 comprising the forwarding policy or information for updating the forwarding policy in the gateway device from the telecommunications network. The 5G-RG may then enforce the forwarding policy or updated forwarding policy when forwarding traffic of the at least one user device towards the telecommunications network in an existing or modified PDU session, step S35.

As noted, the PDU session modification procedure may either be triggered from the telecommunications network (step S30) or from the 5G-RG (step S30').

In the latter case, a PDU session modification request from the 5G-RG may trigger receiving the PDU session modification command message comprising the information for receiving or updating the forwarding policy in the gateway device. A PDU session modification procedure initiated from the 5G-RG may be useful when, for example, new user devices UE connect to the 5G-RG, for example in the home or company network. The obtained forwarding policy may then also apply to the new user device.

A PDU session modification procedure initiated from the telecommunications network may be useful when either the network operator or the user provisions updated forwarding policies in the PCF that should be delivered to the 5G-RG. Such an embodiment using policy updates will be further described with reference to FIG. 5 below.

In each of the above examples of FIGS. 3B-3D, the policy control system PCF may be configured to determine the forwarding policy FP to be provided based on at least one of:

- a subscription identifier of the gateway device;
- a device type identifier of the gateway device;
- a device type identifier of a user device connected to the gateway device; and
- a source address of a user device connected to the gateway device.

One way to obtain the forwarding policy from the network is by cooperation with the unified data system (UDM or UDR), having a subscription identifier of the 5G-RG. The identifier may be a SUPI (Subscription Permanent Identifier), SUCI (Subscription Concealed Identifier) or a Generic Public Subscription Identifier, GPSI, in a message from the SMF or AMF to the PCF. The GPSI is provisioned in the UDM system together with the SUPI (Subscription Permanent Identifier). The PCF may work with the SUPI or GPSI that is coupled to the forwarding policies FP.

The 5G-RG may be configured to transmit its own device type identifier, e.g. an identifier interpreted as a gateway device identifier in the telecommunications network, in a request to obtain a forwarding policy or an update thereof. Such a gateway device identifier may be included in a PDU session establishment request, a PDU session modification request and/or a registration request as mentioned above. The gateway device identifier may assist in obtaining the forwarding policy from the PCF in the telecommunications network.

The 5G-RG may be configured to register a source address of at least one user device UE1, UE2 connected to the 5G-RG. If the source address of the user device is unknown to the gateway device (e.g. when the user device is a new user device or visiting user device), the 5G-RG may transmit an update request including the source address of the user device for updating the forwarding policy, e.g. using a gateway device initiated PDU session modification request shown in FIG. 3D. In one embodiment, the policy control function has been provisioned with the source address and the device type from which the forwarding rules are derived. This may be provisioned by the network operator as part of the subscription data or from higher-level information. In another embodiment, the update request may contain a device type identifier of the user device UE1, UE2 to easily allow obtaining a forwarding policy for a particular device type from the telecommunications network. A new smart phone, such as user device UE1, will probably require other forwarding policies than an IoT (Internet of Things) device, such as user device UE2. Hence, a device type identifier signaling that the connected user device is a smart phone or an IoT device may result in obtaining a different forwarding policy or forwarding rule in the 5G-RG from the PCF using the PDU session modification procedure.

It should be noted that the 5G-RG may also apply local forwarding policies FP, for example for new devices. To that end, the 5G-RG may store device type identifiers and associated forwarding policy or rules thereof. These forwarding policy rules may have been obtained from the telecommunications network in a PDU session establishment procedure, a PDU session modification procedure and/or a registration procedure of the gateway device in the telecommunications network. If a new device connects to the gateway device, the gateway device determines the device type identifier and associates the new device to a locally stored forwarding policy for the device type. This avoids unnecessary signaling from the gateway device to the telecommunications network.

As mentioned above with reference to FIG. 3C, the 5G-RG may be configured to enforce the forwarding policy received in the registration procedure prior to any UE route selection policy, URSP. This embodiment is shown in FIG. 4 and provides the advantage of enforcing a single forwarding policy FP for the 5G-RG irrespective of the number of PDU sessions.

The 5G-RG forwarding policy FP governs what traffic can enter the telecommunications network and is bound to a PDU Session. The URSP rules govern what PDU Session to use for what traffic. It is possible for the 5G-RG to establish multiple PDU Sessions and each of them may have a separate forwarding policy FP which may be the same or different. In one embodiment, it may be desirable to enforce a single forwarding policy FP for the gateway device irrespective of the number of PDU Sessions. This may be achieved by using the registration procedure, i.e. before any PDU session establishment, wherein the 5G-RG registers with the telecommunications network using an initial registration request as shown in FIG. 3C.

Figure 4:
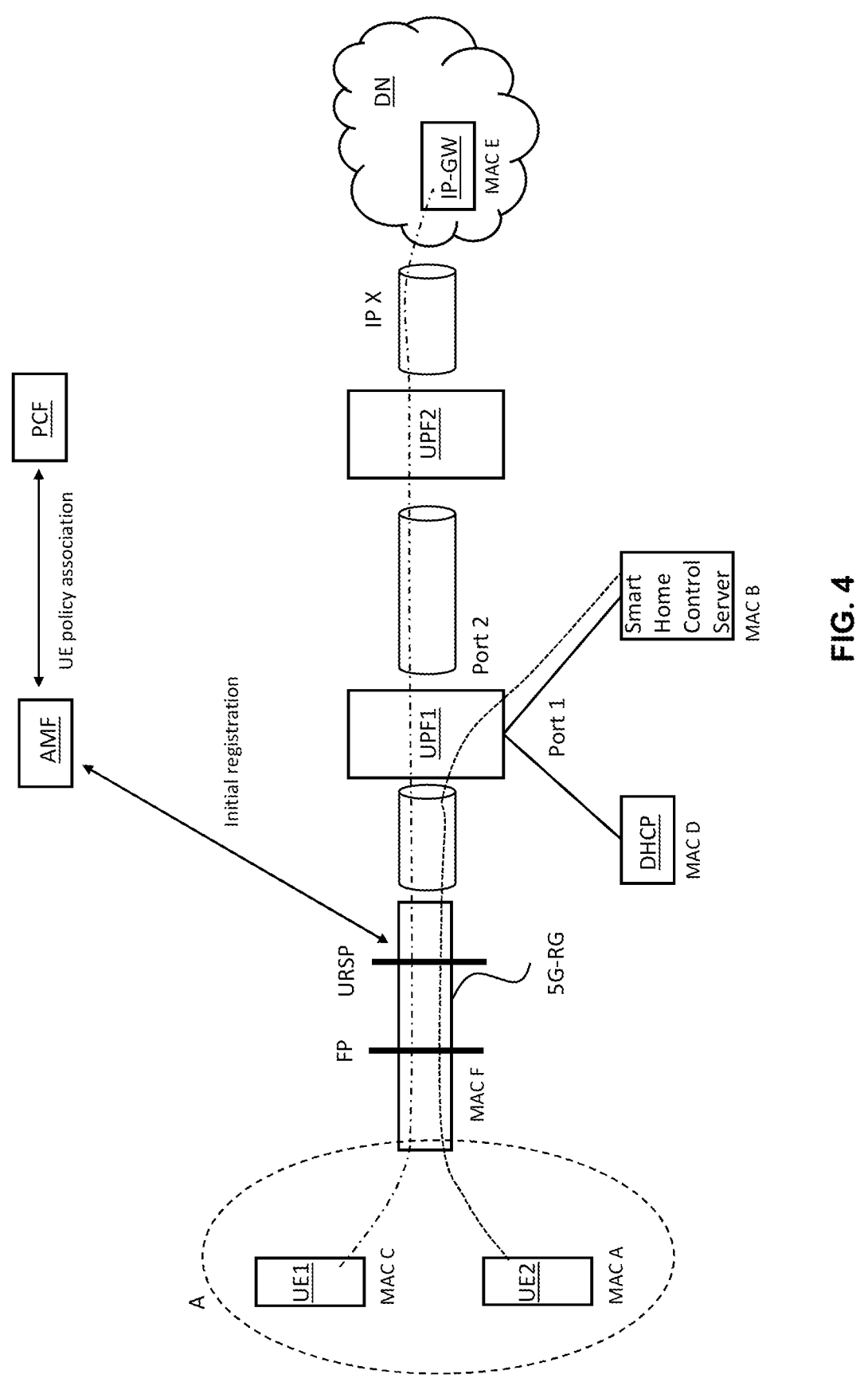
FIG. 4 is a schematic illustration of providing a forwarding policy to a gateway device using a registration procedure of a 5G-RG with the telecommunications network.

In the embodiment of FIG. 4, the AMF obtains the forwarding policy FP from the PCF in a UE policy association procedure and the forwarding policy is provided to the 5G-RG using a UE Configuration Update procedure, either as part of the URSP or in a separate UE forwarding policy container. As schematically shown in FIG. 4, the forwarding policy may be enforced prior to the URSP rules to select a PDU session for traffic forwarding. The application of the forwarding policy FP for outgoing traffic irrespective of the URSP is indicated schematically in FIG. 4 by drawing the FP filter before the URSP filter for outgoing traffic (left to right). In other words, in FIG. 4, the forwarding policy FP applies to both the PDU session for UE1, wherein data traffic to the data network DN (the dash-dotted line) is allowed by the forwarding policy and for the PDU session of UE2, for which only data traffic with the smart home control server (the dashed line) is allowed.

Figure 5:
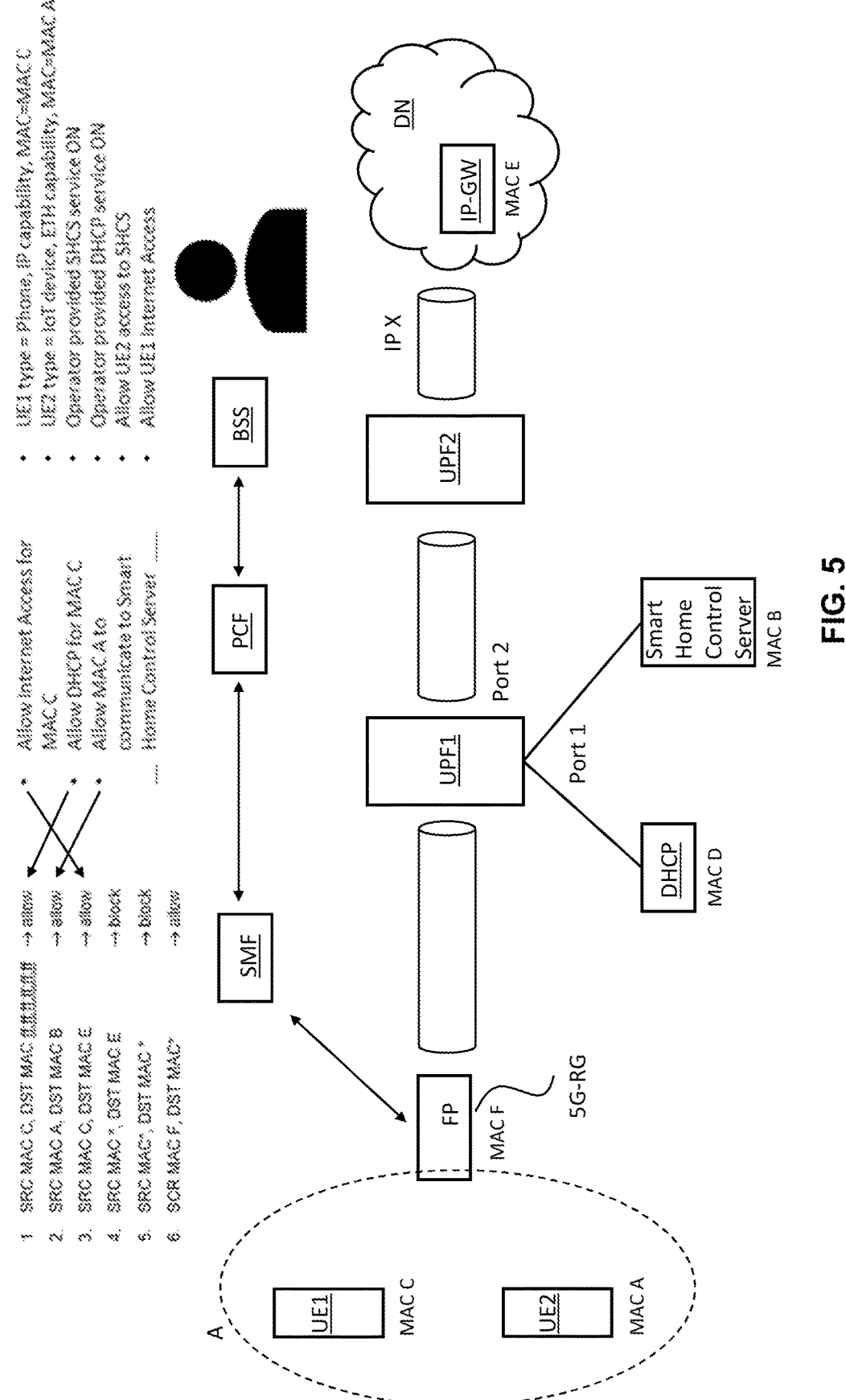
FIG. 5 is a schematic illustration of providing a forwarding policy to a gateway device using a PDU session establishment procedure or PDU session modification procedure

FIG. 5 is a schematic illustration of providing a forwarding policy FP in a PDU session establishment or PDU session modification procedure through interaction with the session management system SMF. In one example, an update of the forwarding policy FP is triggered by action of a user (e.g. the owner or operator of the 5G-RG) interacting with a business support system BSS of the operator of the telecommunications network to define his own policy. In one embodiment, the BSS makes sure that the user cannot enter policy rules that the network operator deems undesirable, e.g. by providing restrictions to rules input by the user.

In the embodiment of FIG. 5, the forwarding policy FP to be provided to the 5G-RG includes operator-defined rules (rules 4-6 at the top left corner of FIG. 5) defined by the operator of the telecommunications network and user-defined rules (rules 1-3 at the top left corner of FIG. 5) for specific user devices UE1, UE2 connected to the 5G-RG. The operator-defined rules may, for example, comprise blocking all traffic from all user devices (see rule 5) to motivate the user of the 5G-RG to program more specific dedicated rules for one or more user devices UE1, UE2 connected to the gateway device. The effect of each of the rules 1-6 has been described above with reference to FIG. 3A.

The formal rules 1-6 may be a derivation of the user readable rules input by the user via the BSS. The user may input rules such as shown at the top right corner of FIG. 5 in more user readable terms, understandable to the user, which are translated into forwarding policy FP with rules 1-6.

In more detail, as seen in FIG. 5, the user provides the necessary parameters via the BSS portal which are then sent to the PCF in step 2 via the Npcf_PolicyAuthorization service (specified in TS 23.502, clause 5.2.5.3 Npcf_PolicyAuthorization Service). The Npcf_Policy Authorization_Create service operation is used providing the 5G-RG MAC F so that the PCF can find the policy control context. Then, as seen in the FIG. 5, the PCF generates rules 1-3 from the provided policy and adds the operator-defined rules 4-6 to prohibit any other traffic to leave the 5G-RG. The policy is then delivered with a PDU Session Modification procedure triggered by PCF initiated SM Policy Association Modification as indicated in FIG. 3D.

Since the automated policy provisioning procedure requires customer action, it beneficial to have notifications if changes need to happen to the policy. This is especially valid if the default policy is to prevent all traffic from being forwarded to the network unless it is explicitly allowed.

One task pertains to the 5G-RG registering a source address of at least one user device UE1, UE2 connected to the 5G-RG. The 5G-RG may, for each source address, monitor forwarding behavior and dependent on statistics transmit a notification to the telecommunications network or a user device (not necessarily UE1 and/or UE2) connected to the 5G-RG. For example, when a user device UE2 is frequently or continuously blocked, the notification may be used to inform the operator of the telecommunications network and/or, optionally via the operator, the owner of the 5G-RG of the particular user device UE2 requiring attention in the forwarding policy FP.

In more detail, in order to generate notifications, the 5G-RG generates basic statistics for blocked traffic and the source address of the packets. In case a set threshold of the number of blocked packets is reached, the 5G-RG sends a UEFP notification to the SMF via a PDU Session Modification Request as shown in FIG. 3D. This notification contains the source address of the blocked packets that reached the threshold. It is then forwarded to the PCF via an Npcf_SMPolicyControl_UpdateNotify service operation (specified in TS 23.502, clause 5.2.5.4.3) that can be presented to a customer via the BSS. In the case of a per device forwarding policy obtained during registration, an appropriate request may be a Mobility Registration Update (specified in TS 23.502, clause 4.2.2.2.2 with the parameter Registration type=Mobility Registration Update) and Npcf_UEPolicyControl_UpdateNotify (specified in TS 23.502, clause 5.2.5.6.3).

The presentation of the notification to the user can be via email, SMS, visual implementation on the gateway device or website allowing access to the forwarding policy, or any other channel.

The notification may be transmitted to the user device UE2 connected to the 5G-RG in order to inform the user that certain traffic originating from that device is blocked by a forwarding policy on the 5G-RG. This notification may, for example, be part of an Internet Control Message Protocol (ICMP) Destination Unreachable message with Code 13 (Communication Administratively Prohibited) sent from the gateway device to the user device. In case ICMP cannot be used (i.e. when only the ethernet layer is present on the communication link, for example), the 5G-RG sends an ethernet frame containing a "Frame Filtered" message with (Communication Administratively Prohibited) code. Other ways to convey the message depending on the access type used are not precluded.

Quite often user devices can be categorized into types and their network traffic is quite similar, perhaps even the same. For example, a smart phone UE1 connecting to the Internet for web browsing will usually have the same characteristics as other phones on the same network. Thus, it may be beneficial to apply default rules based on device categories in order to decrease the number of policy update notifications for a 5G-RG. In case the 5G-RG blocks traffic from a source address that it has never seen, but it receives or extracts the device type connecting to it (via any protocol for device identification running on the home network), it can send a policy update request as part of the PDU Session Modification Request which is described in the previous sections (SM or AM option), including the source address and/or device type. When the PCF receives this update request it generates the updated UEFP with generic rules for the received device type. For example, if a device type=smart phone is only allowed Internet access and requests for IP addresses, the forwarding policy FP may have two rules for an IP/ETH device. A device type=IoT is only allowed to access the smart home control server resulting in a single rule. Thus, if a new phone with MAC G, for example, enters the local network of the 5G-RG, the 5G-RG would initiate this procedure, the PCF will update the UEFP resulting in an updated forwarding policy so that the new phone would have access to the Internet.

In order to have complete control over the forwarding of traffic even for devices that are not complying to configurations or standards, it is possible for an operator to use the mangling action of a forwarding policy in order to configure specific packets to be changed according to network operator policies. For example, if a local network of a 5G-RG contains as a user device an IPTV Set-top box this traffic is usually carried in a specific Ethernet VLAN. That VLAN is configured on the current Residential Gateway and is bound to a specific physical port. Using this embodiment of the invention, the necessity for a separate physical port can be avoided.

If a device type=Set-top box is discovered by the 5G-RG (solutions for this exist and are out of the scope of the invention), it will send a policy update request (SM or AM option) which will end in the PCF. The PCF will then update the UEFP adding a rule which mandates the 5G-RG to add the desired VLAN header to the packets coming from the source address of the Set-top box.

Figure 6:
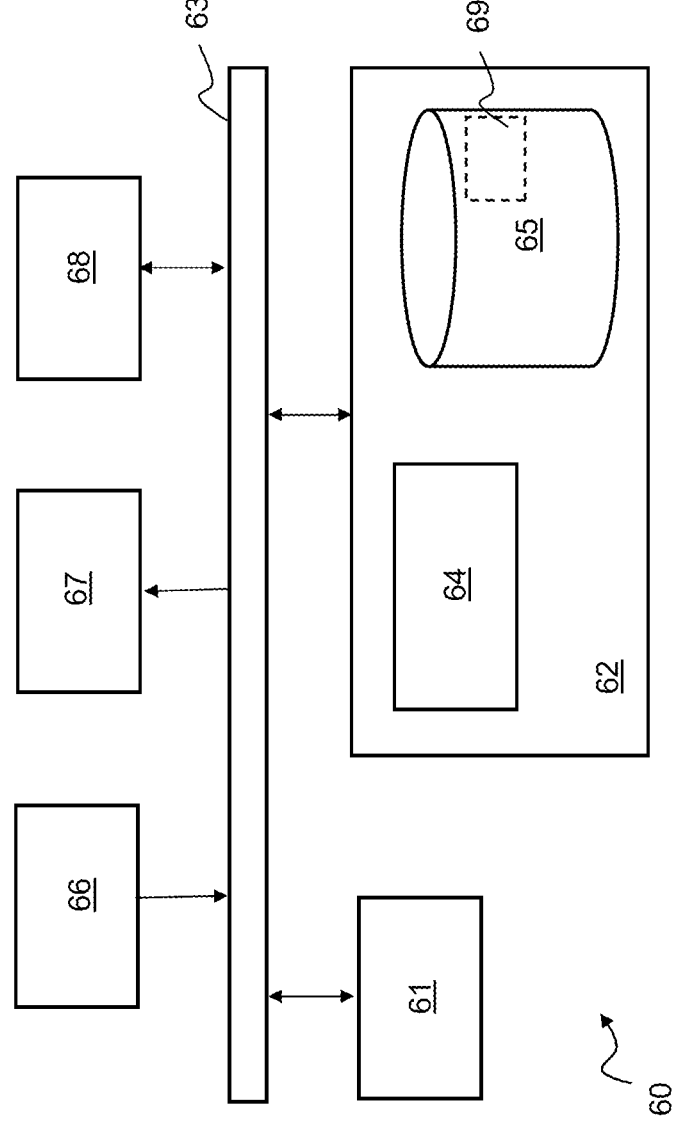
FIG. 6 depicts a processing system according to an embodiment for a processing device or a server system.

FIG. 6 depicts a block diagram illustrating an exemplary processing system according to a disclosed embodiment, e.g. a gateway device, an access mobility system, a session management system and/or a policy control system as disclosed herein. As shown in FIG. 6, the processing system 60 may include at least one processor 61 coupled to memory elements 62 through a system bus 63. As such, the processing system may store program code within memory elements 62. Further, the processor 61 may execute the program code accessed from the memory elements 62 via a system bus 63. In one aspect, the processing system may be implemented as a computer system that is suitable for storing and/or executing program code. It should be appreciated, however, that the processing system 60 may be implemented in the form of any system including a processor and a memory that is capable of performing the functions described within this specification.

The memory elements 62 may include one or more physical memory devices such as, for example, local memory 64 and one or more bulk storage devices 65. The local memory may refer to random access memory or other non-persistent memory device(s) generally used during actual execution of the program code. A bulk storage device may be implemented as a hard drive or other persistent data storage device. The processing system 60 may also include one or more cache memories (not shown) that provide temporary storage of at least some program code in order to reduce the number of times program code must be retrieved from the bulk storage device 65 during execution.

Input/output (I/O) devices depicted as an input device 66 and an output device 67 optionally can be coupled to the processing system. Examples of input devices may include, but are not limited to, a space access keyboard, a pointing device such as a mouse, or the like. Examples of output devices may include, but are not limited to, a monitor or a display, speakers, or the like. Input and/or output devices may be coupled to the processing system either directly or through intervening I/O controllers.

In an embodiment, the input and the output devices may be implemented as a combined input/output device (illustrated in FIG. 6 with a dashed line surrounding the input device 66 and the output device 67). An example of such a combined device is a touch sensitive display, also sometimes referred to as a "touch screen display" or simply "touch screen" that may be provided with the UE. In such an embodiment, input to the device may be provided by a movement of a physical object, such as e.g. a stylus or a finger of a person, on or near the touch screen display.

A network adapter 68 may also be coupled to the processing system to enable it to become coupled to other systems, computer systems, remote network devices, and/or remote storage devices through intervening private or public networks. The network adapter may comprise a data receiver for receiving data that is transmitted by said systems, devices and/or networks to the processing system 60, and a data transmitter for transmitting data from the processing system 60 to said systems, devices and/or networks. Modems, cable modems, and Ethernet cards are examples of different types of network adapter that may be used with the processing system 60.

As pictured in FIG. 6, the memory elements 62 may store an application 69. In various embodiments, the application 69 may be stored in the local memory 64, the one or more bulk storage devices 65, or apart from the local memory and the bulk storage devices. It should be appreciated that the processing system 60 may further execute an operating system (not shown in FIG. 6) that can facilitate execution of the application 69. The application 69, being implemented in the form of executable program code, can be executed by the processing system 60, e.g., by the processor 61. Responsive to executing the application, the processing system 60 may be configured to perform one or more operations or method steps described herein.

In one aspect of the present invention, one or more components of the UE, gateway device and/or system performing an SMF as disclosed herein may represent processing system 60 as described herein.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 61 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope of the claims. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A gateway device for use in a telecommunications network, wherein the telecommunications network comprises a policy control system configured to provide a forwarding policy to the gateway device, wherein the gateway device is configured to forward traffic of at least one user device connected to the gateway device to the telecommunications network, and wherein the gateway device is further configured to:

receive the forwarding policy from the policy control system over the telecommunications network in at least one of:

a protocol data unit, PDU, session establishment procedure;

a PDU session modification procedure; and a registration procedure to register the gateway device in the telecommunications network;

and enforce the received forwarding policy when forwarding traffic of the at least one user device towards the telecommunications network;

wherein the gateway device is configured to at least one of:

register a source address of at least one user device connected to the gateway device and transmit a notification to the telecommunications network or a user device connected to the gateway device dependent on forwarding statistics associated with the registered source address;

register a source address of at least one user device connected to the gateway device and transmit an update request for updating the forwarding policy if the registered source address is unknown to the gateway device;

determine a device type identifier of a connected user device and determine a forwarding policy or rule thereof stored in the gateway device in association with the device type identifier; and transmit a device type identifier of the gateway device to the telecommunications network to facilitate obtaining the forwarding policy.

2. The gateway device according to claim 1, wherein the update request comprises a source address and/or device type identifier of the user device.

3. The gateway device according to claim 1, wherein the gateway device is configured to:

transmit a PDU session establishment request to the telecommunications network for establishing a PDU session with the telecommunications network;

receive the forwarding policy with a PDU session establishment accept message from the telecommunications network; and enforce the forwarding policy received with the PDU session establishment accept message when forwarding traffic of the at least one user device towards the telecommunications network.

4. The gateway device according to claim 1, wherein the gateway device is configured to:

receive a PDU session modification command message from the telecommunications network providing the forwarding policy or comprising information for updating the forwarding policy in the gateway device, and enforce the updated forwarding policy when forwarding traffic of the at least one user device towards the telecommunications network.

5. The gateway device according to claim 4, wherein the gateway device is configured to transmit a PDU session modification request to the telecommunications network triggering receiving the PDU session modification command message from the telecommunications network comprising the information for updating the forwarding policy in the gateway device.

6. The gateway device according to claim 1, wherein the gateway device is configured to:

transmit a registration request for initial registration of the gateway device in the telecommunications network; and receive the forwarding policy in a UE configuration update procedure in response to transmitting the registration request.

7. The gateway device according to claim 6, wherein the gateway device is configured to enforce the forwarding policy received in the UE configuration update procedure prior to any UE route selection policy, URSP.

8. A gateway device for use in a telecommunications network, wherein the telecommunications network comprises a policy control system configured to provide a forwarding policy to the gateway device, wherein the gateway device is configured to forward traffic of at least one user device connected to the gateway device to the telecommunications network, and wherein the gateway device is further configured to:

receive the forwarding policy from the policy control system over the telecommunications network in at least one of:

a protocol data unit, PDU, session establishment procedure;

a PDU session modification procedure; and a registration procedure to register the gateway device in the telecommunications network;

and enforce the received forwarding policy when forwarding traffic of the at least one user device towards the telecommunications network;

wherein the gateway device is configured to be connected to a user plane system in the telecommunications network by means of a protocol stack with a first communication layer for a first communication protocol, wherein the forwarding policy for the gateway device includes at least one forwarding rule that analyzes the header of a data packet according to the first communication protocol.

9. The gateway device according to claim 8, wherein the gateway device is configured to:

transmit a PDU session establishment request to the telecommunications network for establishing a PDU session with the telecommunications network;

receive the forwarding policy with a PDU session establishment accept message from the telecommunications network; and enforce the forwarding policy received with the PDU session establishment accept message when forwarding traffic of the at least one user device towards the telecommunications network.

10. The gateway device according to claim 8, wherein the gateway device is configured to:

receive a PDU session modification command message from the telecommunications network providing the forwarding policy or comprising information for updating the forwarding policy in the gateway device, and enforce the updated forwarding policy when forwarding traffic of the at least one user device towards the telecommunications network.

11. The gateway device according to claim 10, wherein the gateway device is configured to transmit a PDU session modification request to the telecommunications network triggering receiving the PDU session modification command message from the telecommunications network comprising the information for updating the forwarding policy in the gateway device.

12. The gateway device according to claim 8, wherein the gateway device is configured to:

transmit a registration request for initial registration of the gateway device in the telecommunications network; and receive the forwarding policy in a UE configuration update procedure in response to transmitting the registration request.

13. The gateway device according to claim 12, wherein the gateway device is configured to enforce the forwarding policy received in the UE configuration update procedure prior to any UE route selection policy, URSP.

14. A gateway device for use in a telecommunications network, wherein the telecommunications network comprises a policy control system configured to provide a forwarding policy to the gateway device, wherein the gateway device is configured to forward traffic of at least one user device connected to the gateway device to the telecommunications network, and wherein the gateway device is further configured to:

receive the forwarding policy from the policy control system over the telecommunications network in at least one of:

a protocol data unit, PDU, session establishment procedure;

a PDU session modification procedure; and a registration procedure to register the gateway device in the telecommunications network; and enforce the received forwarding policy when forwarding traffic of the at least one user device towards the telecommunications network;

wherein the gateway device is configured to modify a PDU based on the forwarding rules obtained from the telecommunications network, wherein modifying the PDU comprises adding a VLAN header to the PDU.

15. The gateway device according to claim 14, wherein the gateway device is configured to:

transmit a PDU session establishment request to the telecommunications network for establishing a PDU session with the telecommunications network;

receive the forwarding policy with a PDU session establishment accept message from the telecommunications network; and enforce the forwarding policy received with the PDU session establishment accept message when forwarding traffic of the at least one user device towards the telecommunications network.

16. The gateway device according to claim 14, wherein the gateway device is configured to:

receive a PDU session modification command message from the telecommunications network providing the forwarding policy or comprising information for updating the forwarding policy in the gateway device, and enforce the updated forwarding policy when forwarding traffic of the at least one user device towards the telecommunications network.

17. The gateway device according to claim 16, wherein the gateway device is configured to transmit a PDU session modification request to the telecommunications network triggering receiving the PDU session modification command message from the telecommunications network comprising the information for updating the forwarding policy in the gateway device.

18. The gateway device according to claim 14, wherein the gateway device is configured to:

transmit a registration request for initial registration of the gateway device in the telecommunications network; and receive the forwarding policy in a UE configuration update procedure in response to transmitting the registration request.

19. The gateway device according to claim 18, wherein the gateway device is configured to enforce the forwarding policy received in the UE configuration update procedure prior to any UE route selection policy, URSP.

20. A method in a gateway device for use in a telecommunications network, wherein the telecommunications network comprises a policy control system configured to provide a forwarding policy to the gateway device, wherein the gateway device is configured to forward traffic of at least one user device connected to the gateway device to the telecommunications network, the method comprising:

receiving the forwarding policy from the policy control system over the telecommunications network in at least one of:

a protocol data unit, PDU, session establishment procedure;

a PDU session modification procedure; and a registration procedure to register the gateway device in the telecommunications network; and enforcing the received forwarding policy when forwarding traffic of the at least one user device towards the telecommunications network;

wherein the method further comprises at least one of:

registering a source address of at least one user device connected to the gateway device and transmit a notification to the telecommunications network or a user device connected to the gateway device dependent on forwarding statistics associated with the registered source address;

registering a source address of at least one user device connected to the gateway device and transmit an update request for updating the forwarding policy if the registered source address is unknown to the gateway device;

determining a device type identifier of a connected user device and determine a forwarding policy or rule thereof stored in the gateway device in association with the device type identifier; and transmitting a device type identifier of the gateway device to the telecommunications network to facilitate obtaining the forwarding policy.

21. The method according to claim 20, wherein the method further comprises at least one of:

transmitting a PDU session establishment request to the telecommunications network for establishing a PDU session with the telecommunications network;

receiving the forwarding policy with a PDU session establishment accept message from the telecommunications network;

enforcing the forwarding policy received with the PDU session establishment accept message when forwarding traffic of the at least one user device towards the telecommunications network.

22. A method in a gateway device for use in a telecommunications network, wherein the telecommunications network comprises a policy control system configured to provide a forwarding policy to the gateway device, wherein the gateway device is configured to forward traffic of at least one user device connected to the gateway device to the telecommunications network, wherein the gateway device is configured to be connected to a user plane system in the telecommunications network by means of a protocol stack with a first communication layer for a first communication protocol, wherein the forwarding policy for the gateway device includes at least one forwarding rule that analyzes the header of a data packet according to the first communication protocol, the method comprising:

receiving the forwarding policy from the policy control system over the telecommunications network in at least one of:

a protocol data unit, PDU, session establishment procedure;

a PDU session modification procedure; and a registration procedure to register the gateway device in the telecommunications network;

and enforcing the received forwarding policy when forwarding traffic of the at least one user device towards the telecommunications network.

23. The method according to claim 22, wherein the method further comprises at least one of:

transmitting a PDU session establishment request to the telecommunications network for establishing a PDU session with the telecommunications network;

receiving the forwarding policy with a PDU session establishment accept message from the telecommunications network;

enforcing the forwarding policy received with the PDU session establishment accept message when forwarding traffic of the at least one user device towards the telecommunications network.

24. A method in a gateway device for use in a telecommunications network, wherein the telecommunications network comprises a policy control system configured to provide a forwarding policy to the gateway device, wherein the gateway device is configured to forward traffic of at least one user device connected to the gateway device to the telecommunications network, the method comprising:

receiving the forwarding policy from the policy control system over the telecommunications network in at least one of:

a protocol data unit, PDU, session establishment procedure;

a PDU session modification procedure; and a registration procedure to register the gateway device in the telecommunications network;

and enforcing the received forwarding policy when forwarding traffic of the at least one user device towards the telecommunications network; and modifying a PDU based on the forwarding rules obtained from the telecommunications network, wherein modifying the PDU comprises adding a VLAN header to the PDU.

25. The method according to claim 24, wherein the method further comprises:

transmitting a PDU session establishment request to the telecommunications network for establishing a PDU session with the telecommunications network;

receiving the forwarding policy with a PDU session establishment accept message from the telecommunications network;

enforcing the forwarding policy received with the PDU session establishment accept message when forwarding traffic of the at least one user device towards the telecommunications network.

* * * * *